United States Patent
Choi et al.

(10) Patent No.: US 11,295,275 B2
(45) Date of Patent: Apr. 5, 2022

(54) SYSTEM AND METHOD OF PROVIDING TO-DO LIST OF USER

(71) Applicant: SAMSUNG ELECTRONICS CO., LTD., Suwon-si (KR)

(72) Inventors: Hyung-tak Choi, Suwon-si (KR); Hae-hun Yang, Seoul (KR); Hee-sik Jeon, Yongin-si (KR); In-chul Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 888 days.

(21) Appl. No.: 15/852,361

(22) Filed: Dec. 22, 2017

(65) Prior Publication Data

US 2018/0181922 A1 Jun. 28, 2018

(30) Foreign Application Priority Data

Dec. 23, 2016 (KR) .......................... 10-2016-0177948
Oct. 25, 2017 (KR) .......................... 10-2017-0139545

(51) Int. Cl.
*G06Q 10/10* (2012.01)
*G06Q 10/06* (2012.01)
(Continued)

(52) U.S. Cl.
CPC ....... *G06Q 10/1097* (2013.01); *G06F 3/0482* (2013.01); *G06F 11/3438* (2013.01); *G06Q 10/06311* (2013.01)

(58) Field of Classification Search
CPC ............. G06Q 10/1097; G06Q 10/101; G06Q 10/06311
See application file for complete search history.

(56) References Cited

U.S. PATENT DOCUMENTS 8,069,422 B2   11/2011   Sheshagiri et al.
8,779,920 B2   7/2014    Garnier et al.
(Continued)

FOREIGN PATENT DOCUMENTS

EP   1 571 578   9/2005
EP   3 040 915   7/2016
(Continued)

OTHER PUBLICATIONS

Sow, Daby; Ebling, Maria; Lehmann, Rene-Pierre; Davis, John; and Bergman, Lawrence. SCOUT Contextually Organizes User Tasks. IEEE International Conference on e-Business Engineering. (Year: 2005).*

(Continued)

*Primary Examiner* — Johnna R Loftis
(74) *Attorney, Agent, or Firm* — Sughrue Mion, PLLC

(57) ABSTRACT

Provided are a system and/or method of providing a to-do list of a user. A device for providing a to-do list of a user may include: a communicator configured to communicate with an external device; a display; and a processor configured to determine at least one keyword used to determine at least one task to be performed by the user in the to-do list, based on data obtained by an application executed on the display, generate a keyword list of the determined at least one keyword, and display a graphical user interface (GUI) for selecting at least one of the at least one keyword in the keyword list by controlling the display.

17 Claims, 34 Drawing Sheets

(51) Int. Cl.
*G06F 3/0482* (2013.01)
*G06F 11/34* (2006.01)

(56) References Cited

U.S. PATENT DOCUMENTS

| | | | |
|---|---|---|---|
| 9,633,114 B1* | 4/2017 | Kamangar | G06Q 10/1093 |
| 11,164,160 B2 | 11/2021 | Choi | |
| 2003/0172368 A1 | 9/2003 | Alumbaugh et al. | |
| 2005/0096950 A1 | 5/2005 | Caplan et al. | |
| 2007/0073810 A1 | 3/2007 | Adams et al. | |
| 2007/0106495 A1* | 5/2007 | Ramsey | G06F 40/35 |
| | | | 704/9 |
| 2007/0300225 A1* | 12/2007 | Macbeth | G06Q 10/10 |
| | | | 718/100 |
| 2008/0306963 A1 | 12/2008 | Adler et al. | |
| 2009/0094623 A1* | 4/2009 | Chakra | G06Q 10/109 |
| | | | 719/329 |
| 2010/0004921 A1* | 1/2010 | Hufnagel | G06F 40/56 |
| | | | 704/9 |
| 2011/0126123 A1* | 5/2011 | Refer | G06Q 10/109 |
| | | | 715/751 |
| 2011/0145822 A1* | 6/2011 | Rowe | G06Q 10/10 |
| | | | 718/100 |
| 2012/0035925 A1* | 2/2012 | Friend | G06F 3/167 |
| | | | 704/235 |
| 2013/0007648 A1 | 1/2013 | Gamon et al. | |
| 2013/0085815 A1 | 4/2013 | Onischuk | |
| 2013/0145271 A1* | 6/2013 | Desai | G06F 3/167 |
| | | | 715/727 |
| 2014/0025443 A1 | 1/2014 | Onischuk | |
| 2014/0101079 A1 | 4/2014 | Deal | |
| 2014/0141810 A1 | 5/2014 | Shin et al. | |
| 2014/0173602 A1 | 6/2014 | Kikin-Gil et al. | |
| 2014/0189017 A1 | 7/2014 | Prakash et al. | |
| 2014/0231512 A1 | 8/2014 | Onischuk | |
| 2014/0289265 A1* | 9/2014 | Mustaine | G06Q 10/109 |
| | | | 707/755 |
| 2014/0324426 A1 | 10/2014 | Lu et al. | |
| 2014/0365281 A1 | 12/2014 | Onischuk | |
| 2014/0379750 A1 | 12/2014 | Urmy et al. | |
| 2015/0012339 A1 | 1/2015 | Onischuk | |
| 2015/0088312 A1 | 3/2015 | Lo et al. | |
| 2015/0286383 A1* | 10/2015 | D'Aloisio | G06F 3/0482 |
| | | | 715/748 |
| 2016/0086116 A1* | 3/2016 | Rao | G06Q 10/06311 |
| | | | 705/7.21 |
| 2016/0155096 A1 | 6/2016 | Choi | |

FOREIGN PATENT DOCUMENTS

| | | |
|---|---|---|
| KR | 10-2014-0136820 | 12/2014 |
| KR | 10-2016-0055000 | 5/2016 |
| KR | 10-2016-0063913 | 6/2016 |

OTHER PUBLICATIONS

PCT International Search Report dated Apr. 20, 2018 for PCT/KR2017/015234.
European Search Report dated Aug. 7, 2019 for EP Application No. 17883846.2.
Communication dated Feb. 18, 2021, issued by the India Intellectual Property Office in Indian Patent Application No. 201947029388.
Communication dated Feb. 7, 2022, issued by the Korean Patent Application No. 10-2017-0139545.

* cited by examiner

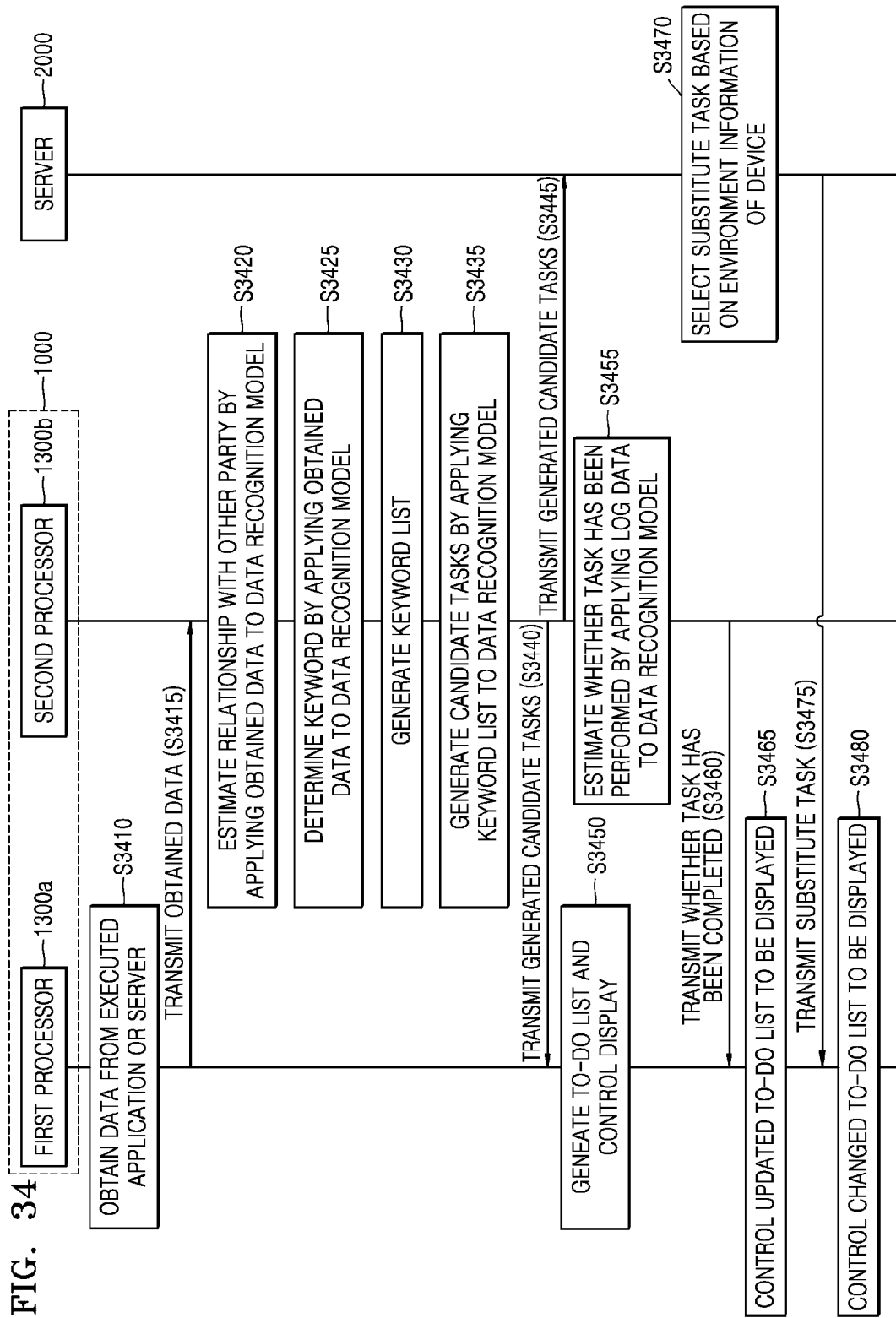

SYSTEM AND METHOD OF PROVIDING TO-DO LIST OF USER

CROSS-REFERENCE TO RELATED APPLICATIONS

This application is based on and claims the benefit of Korean Patent Application Nos. 10-2016-0177948 filed on Dec. 23, 2016, and 10-2017-0139545 filed Oct. 25, 2017, in the Korean Intellectual Property Office, the disclosures of which are incorporated herein in their entireties by reference.

BACKGROUND

1. Field

The present disclosure relates to systems and/or methods of providing to-do lists of users, and more particularly, to an artificial intelligence (AI) system and its application technology that simulate functions such as cognition and/or judgment of a human brain by using a machine learning algorithm such as deep learning.

2. Description of the Related Art

As multimedia technology and network technology have been developed, users may use desired services through various devices and service providing servers. In addition, users may communicate with other users' devices by using their own devices. As users may use the various devices and the service providing servers, it becomes difficult for the users to effectively check their own tasks.

Also, artificial intelligence (AI) systems have recently been introduced in the field of image processing.

An AI system is a computer system that may exhibit human-level intelligence and is getting smarter by learning and judging by itself unlike an existing rule-based smart system. The more the AI system is used, the higher recognition rate and the better understanding of a user's taste. Accordingly, existing rule-based smart systems are being gradually replaced by deep learning-based AI systems.

AI technology includes machine learning (e.g., deep learning) and element technologies using the machine learning.

Machine learning is an algorithm technology that classifies/learns characteristics of input data by itself, and element technologies are technologies that simulate functions such as cognition and judgment of a human brain by using a machine learning algorithm such as deep learning and include technical fields such as linguistic understanding, visual understanding, inference/prediction, knowledge representation, and motion control.

Various fields to which AI technology is applied are as follows. Linguistic understanding is a technology for recognizing and applying/processing human languages/characters and includes natural language processing, machine translation, dialog systems, question answering, and voice recognition/synthesis. Visual understanding is a technology for recognizing and processing objects like a human visual system and includes object recognition, object tracking, image search, person recognition, scene understanding, spatial understanding, and image enhancement. Inference/prediction is a technology for judging information and making logical inference and prediction and includes knowledge/probability-based reasoning, optimization prediction, preference-based planning, and recommendation. Knowledge representation is an automation technology for incorporating human experience information into knowledge data and includes knowledge building (e.g., data generation/classification), and knowledge management (e.g., data utilization). Motion control is a technology for controlling the driving of autonomous vehicles and the motion of robots and includes movement control (e.g., navigation, collision, or driving), and manipulation control (e.g., behavior control).

SUMMARY

Provided are a system and method of providing a to-do list(s) of a user(s) which may determine tasks in the to-do list(s) of the user based on operations of the user's device(s) and a service providing server(s) to which the user subscribes. There is a demand for technology for analyzing an operation related to a user's device and generating and providing a to-do list of the user.

Also provided are a device and method of providing a to-do list of a user which may edit keywords used to determine tasks in the to-do list and may display a candidate task list and a graphical user interface (GUI) for editing the candidate task list.

Also provided are a system and method of providing a to-do list of a user which may provide a task for replacing a task in the to-do list.

Also provided are a system and method of providing a to-do list of a user which may determine whether a task in the to-do list has been performed based on condition information for determining whether the task in the to-do list has been performed.

Additional aspects will be set forth in part in the description which follows and, in part, will be apparent from the description, or may be learned by practice of the presented embodiments.

According to an aspect of an example embodiment, a device for providing a to-do list of a user includes: a communicator, including communication circuitry, configured to communicate with an external device; a display; and a processor, including processing circuitry, configured to determine at least one keyword used to determine at least one task to be performed by the user in the to-do list, based on data obtained by an application executed on the display, generate a keyword list of the determined at least one keyword, and display a graphical user interface (GUI) for selecting at least one of the at least one keyword in the keyword list by controlling the display.

According to an aspect of another example embodiment, a method by which a device provides a to-do list of a user includes: obtaining data used to generate the to-do list from an application executed on a display of the device; determining at least one keyword used to determine at least one task to be performed by the user in the to-do list, based on the obtained data; generating a keyword list of the determined at least one keyword; and displaying a graphical user interface (GUI) for selecting at least one of the at least one keyword in the keyword list by controlling the display.

According to an aspect of another example embodiment, a server for providing a to-do list of a user includes: a communicator, including communication circuitry, configured to receive data obtained by an application executed in a device of the user from the device of the user; a memory configured to store the received data and data related to a service to which the user subscribes; and a processor configured to determine at least one keyword used to determine at least one task to be performed by the user in the to-do list based on the received data, and determine at least one candidate task related to the at least one keyword based on the received data and the data related to the service to which the user subscribes, wherein the communicator is further configured to transmit the determined at least one candidate task to the device of the user.

According to an aspect of another example embodiment, a method by which a server provides a to-do list of a user includes: receiving data obtained by an application executed in a device of the user from the device of the user; determining at least one keyword used to determine at least one task to be performed by the user in the to-do list based on the received data; determining at least one candidate task related to the at least one keyword, based on the received data and data related to a service that is stored in the server, wherein the service is service to which the user subscribes; and transmitting the determined at least one candidate task to the device of the user.

According to an aspect of another example embodiment, a non-transitory computer-readable recording medium has embodied thereon a program for executing a method by which a device provides a to-do list of a user, the method including: obtaining data used to generate the to-do list from an application executed on a display of the device; determining at least one keyword used to determine at least one task to be performed by the user in the to-do list, based on the obtained data; generating a keyword list of the determined at least one keyword; and displaying a graphical user interface (GUI) for selecting at least one of the at least one keyword in the keyword list by controlling the display.

BRIEF DESCRIPTION OF THE DRAWINGS

These and/or other aspects will become apparent and more readily appreciated from the following description of the embodiments, taken in conjunction with the accompanying drawings in which reference numerals denote structural elements and:

FIG. 34 is a flowchart for explaining a situation in which a device manages a to-do list by using a first processor, a second processor, and a server.

DETAILED DESCRIPTION

The terms used in the present disclosure have been selected from general terms in consideration of the functions in the embodiments. However, these terms may vary according to the intention of any person of ordinary skill in the art, legal precedents, or the advent of new technologies. Also, some of the terms used herein may be arbitrarily chosen by the present applicant. In this case, these terms are defined in detail in the Detailed Description section. Accordingly, the specific terms used herein should be understood based on the unique meanings thereof and the whole context of the present disclosure.

When a part may "include" a certain constituent element, unless specified otherwise, it may not be construed to exclude another constituent element, but instead may be construed to further include other constituent elements. The term "unit" used herein means a software component or a hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors, each including processing circuitry. Thus, for example, the term "unit" may refer to components such as software components, object-oriented software components, class components, and task components, and may include processes, functions, attributes, procedures, subroutines, segments of program code, drivers, firmware, micro-codes, circuits, data, a database, data structures, tables, arrays, or variables. A function provided by the components and "units" may be associated with the smaller number of components and "units", or may be divided into additional components and "units".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of embodiments. As used herein, the term "and/or", includes any and all combinations of one or more of the associated listed items.

As used herein, the term "and/or" includes any and all combinations of one or more of the associated listed items. Expressions such as "at least one of", when preceding a list of elements, modify the entire list of elements and do not modify the individual elements of the list.

Figure 1:
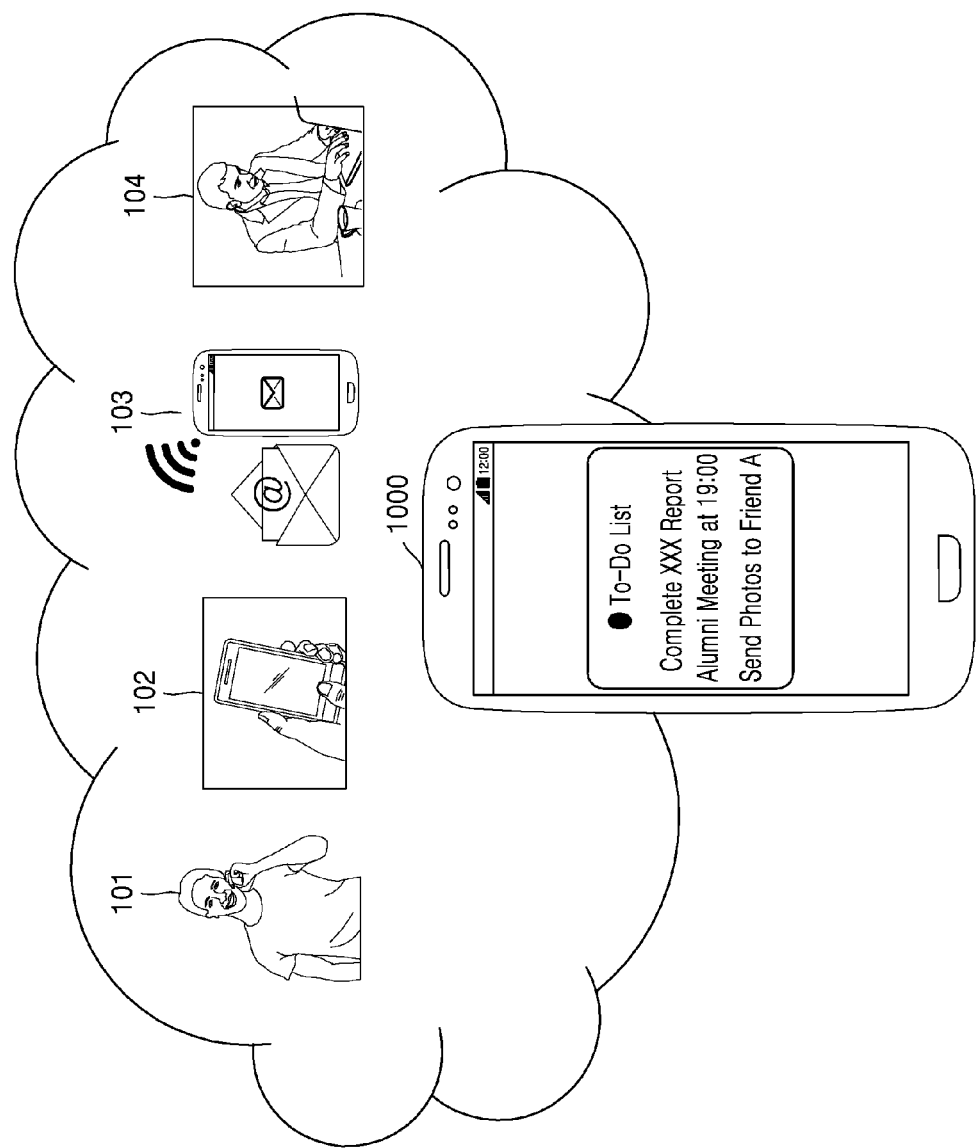
FIG. 1 is a view illustrating an example where a device provides a to-do list of tasks to be performed by a user.

FIG. 1 is a view illustrating an example where a device 1000 provides a to-do list of tasks to be performed by a user according to an example embodiment.

Referring to FIG. 1, the electronic device 1000 may obtain data used to generate a to-do list(s) of a user from a plurality of applications installed in the device 1000. The plurality of applications may include, but are not limited to, a call application 101 for transmitting/receiving a voice signal between the device 1000 of the user and another user's device, a message application 102 for communication between the device 1000 of the user and the other user's device, an email application 103, a notepad application 104 for recording a memo of the user, and a schedule management application (not shown) for managing a schedule of the user.

The device 1000 may determine at least one task to be performed by the user by analyzing data obtained from applications installed and/or executed in the device 1000, and may generate a to-do list of the at least one task. The device 1000 may notify the generated to-do list to the user. The device 1000 may display the to-do list on a display of the device 1000.

Also, the device 1000 may monitor whether at least one task in the to-do list has been performed. The device 1000 may update tasks in the to-do list, based on a result of the monitoring.

Examples of the electronic device 1000 may include, but are not limited to, a smartphone, a tablet PC, a PC, a smart TV, a mobile phone, a personal digital assistant (PDA), a laptop, a media player, a micro-server, a global positioning system (GPS) device, an electronic book terminal, a digital broadcasting terminal, a navigation system, a kiosk, an MP3 player, a digital camera, and other mobile or non-mobile computing devices. Also, the device 1000 may be a wearable device such as a watch, glasses, a hair band, or a ring, having a communication function and a data processing function.

Figure 2:
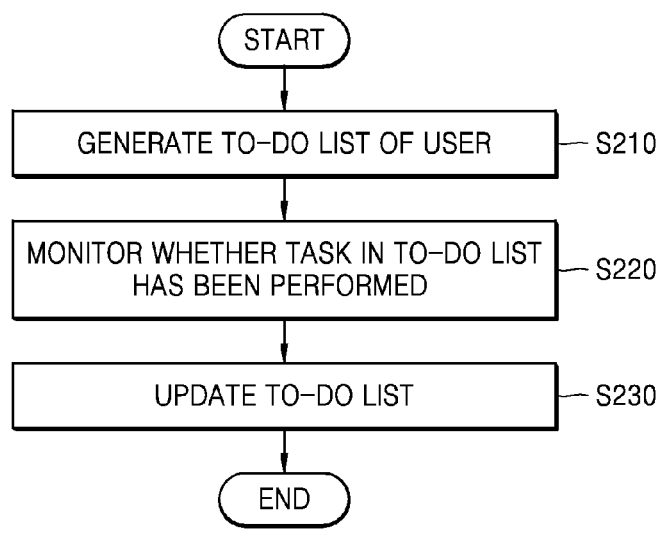
FIG. 2 is a flowchart of a method by which a device manages a to-do list of a user according to an embodiment.

FIG. 2 is a flowchart of a method by which the device 1000 manages a to-do list of a user according to an example embodiment.

In operation S210, the device 1000 may generate a to-do list of a user. The device 1000 may determine at least one task to be performed by the user by analyzing data obtained from an application(s) executed and/or installed in the device 1000, and may generate a to-do list of the at least one task.

Also, the device 1000 may receive data related to the data obtained by the application in the device 1000 from a server 2000. The server 2000 may be, but is not limited to, a service providing server to which the user subscribes. The device 1000 may determine candidate tasks of the at least one task to be performed by the user by combining all or some of the data obtained by the application in the device 1000 and the data obtained from the server 2000. The device 1000 may determine at least one selected from among the candidate tasks as a task to be performed by the user, and may generate a to-do list.

In operation S220, the device 1000 may monitor whether at least one task in the to-do list has been performed. The device 1000 may obtain condition information used to determine whether at least one task in the to-do list has been performed, and may monitor whether at least one task in the to-do list has been performed, based on the condition information. Examples of the condition information may include, but are not limited to, an application used to perform a predetermined task, operation information of the user related to the application, and detailed operation information of the application according to the operation information of the user.

In operation S230, the device 1000 may update the to-do list, based at least on a result of the monitoring. For example, when it is determined that a first task in the to-do list has been performed, the device 1000 may remove the first task from the to-do list, while leaving other tasks not yet performed in the to-do list. Also, when it is determined that the first task in the to-do list has not been performed by a predetermined time, the device 1000 may output information indicating that the first task has not been performed.

Figure 3:
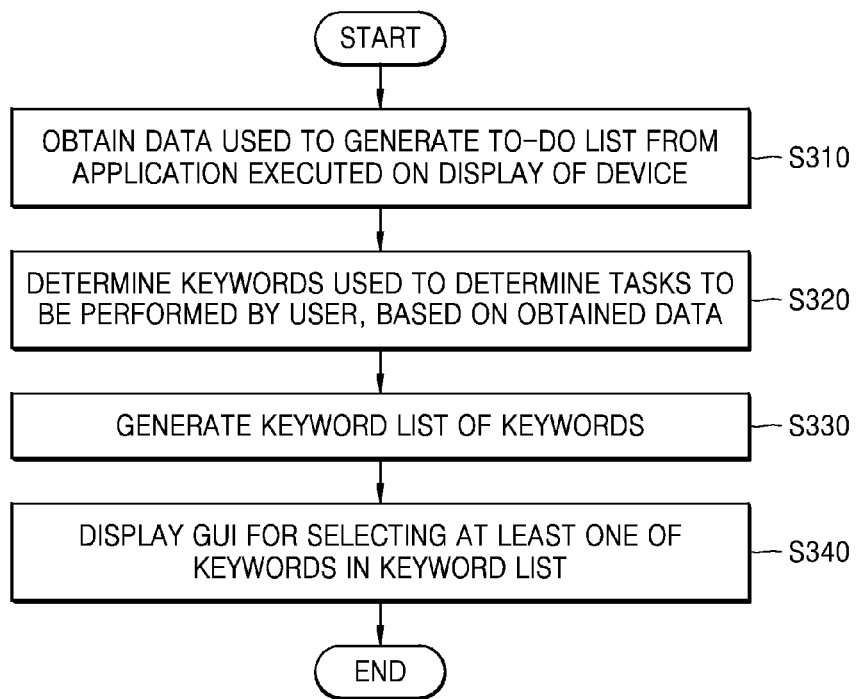
FIG. 3 is a flowchart of a method by which a device generates a keyword list used to determine tasks to be performed by a user and selects a keyword according to an embodiment.

FIG. 3 is a flowchart of a method by which the device 1000 generates a keyword list used to determine tasks to be performed by a user and selects a keyword according to an example embodiment.

In operation S310, the device 1000 may obtain data used to generate a to-do list of a user from an application(s) executed on a display of the device 1000. For example, the device 1000 may obtain data about a message transmitted/received by a chatting application executed on the display.

Also, the device 1000 may obtain data used to generate a to-do list of the user from a plurality of applications installed in the device 1000. Examples of the obtained data may include, but are not limited to, content of a call through the device 1000, content of a message transmitted/received through the device 1000 (e.g., a short message service (SMS) message, a multimedia message service (MMS) message, a chatting message, or an e-mail), content of voice recorded on the device 1000, and data about a text file, a photo, a video, a schedule of the user, or a memo stored in the device 1000.

In operation S320, the device 1000 may determine keywords used to determine tasks to be performed by the user, based on the obtained data. For example, when the application executed on the display is a chatting application for communication between the device 1000 of the user and another user's external electronic device (e.g., smartphone, tablet, PC, etc.), the device 1000 may extract at least one keyword from text transmitted/received between the device 1000 and the external device. The device 1000 may analyze the text transmitted/received between the device 1000 and the external device, and may determine keywords used to determine the tasks to be performed by the user based on a result of the analysis.

Regarding a method of analyzing text and a method of determining a keyword, the device 1000 may perform analysis by using various data mining techniques. Also, the device 1000 may analyze content of the text transmitted/received between the device 1000 and the external device by using various natural language analysis techniques. In this case, the device 1000 may analyze the meaning of the content of the text by using a natural language processing method such as morpheme analysis or syntax analysis. The device 1000 may determine keywords corresponding to interrogative words such as "who", "when", "where", "what", "how", and/or "why", based on the analyzed meaning of the content of the text.

Alternatively, when the application executed on the display is a call application through the device 1000, the device 1000 may convert call voice into text by using speech-to-text (STT) conversion technology in real time, may analyze the text, and may determine keywords used to determine the tasks. Also, when the call application is executed and a call is made between the device 1000 and the external device, the device 1000 may record call voice. The device 1000 may convert the recorded call voice into text, may analyze the text, and may determine a keyword. Also, the device 1000 may transmit the recorded call voice to the server 2000, and may receive from the server 2000 text converted from the call voice.

Alternatively, when the application executed on the display is a gallery application for managing a photo or a video, the device 1000 may process the photo or the video stored in the device 1000, and may determine keywords used to determine the tasks from the photo or the video.

Also, the device 1000 may determine keywords used to determine the tasks to be performed by the user, based on data obtained by the application executed on the display and data obtained by at least one application installed in the device 1000.

In operation S330, the device 1000 may generate a keyword list of the keywords. The device 1000 may generate a keyword list including all of the keywords generated from the data obtained by the application executed on the display. Also, the device 1000 may generate a keyword list used to determine at least one task to be performed by the user in the to-do list by combining all or some of the generated keywords.

Also, the device 1000 may generate a keyword list by combining all or some of the keywords generated from the data obtained by the application executed on the display and keywords generated from the data obtained by the application installed in the device 1000. When the device 1000 generates a keyword list by using not only the keywords generated from the data obtained by the application executed on the display but also the keywords generated from the data obtained by another application installed in the device 1000, a keyword list more suitable for the user's intention may be generated.

In operation S340, the device 1000 may display a graphical user interface (GUI) for selecting at least one from among the keywords in the keyword list. The GUI may receive a predetermined command or data from the user. A processor, including processing circuitry, of the device 1000 may generate the GUI, may output the GUI to a display screen by controlling the display.

Also, the device 1000 may display the GUI for selecting at least one from among the keywords in the keyword list, on an execution screen of the executed application by controlling the display. In this case, the device 1000 may display the GUI at a pre-designated location on the execution screen of the executed application. Also, the device 1000 may display the GUI on a portion of the execution screen of the executed application where no information is displayed. Also, the device 1000 may semi-transparently display the GUI on the execution screen of the application.

Also, the device 1000 may display the GUI on a new execution screen, instead of the execution screen of the application that is already being executed. For example, the new execution screen may be an execution screen on which only the GUI for selecting at least one from among the keywords in the keyword list is displayed.

Figure 4:
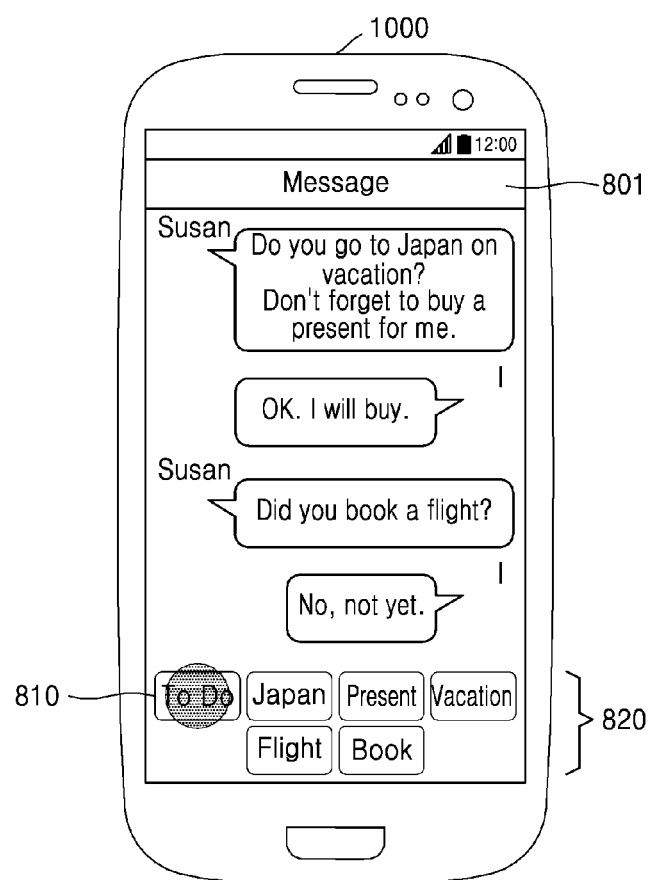
FIG. 4 is a view illustrating an example where a device displays a keyword list on an execution screen of a message application, according to an embodiment.

FIG. 4 is a view illustrating an example where the device 1000 displays a keyword list 810 on an execution screen 801 of a message application, according to an example embodiment.

A user may transmit/receive a message to/from another user through a message application installed in the device 1000. The device 1000 may obtain data about text transmitted/received between the users from the message application. The device 1000 may analyze content of a dialog between the user of the device 1000 and the other user of an external device based on the obtained data. The device 1000 may determine at least one keyword 820 used to determine tasks to be performed by the user based on the analyzed content of the dialog. The device 1000 may generate the keyword list 810 of the determined at least one keyword 820 and may display the keyword list 810 on the execution screen 801 of the message application.

Referring to FIG. 4, the device 1000 may display a message transmitted/received between the user (I) of the device 1000 and the other user (Susan) of the external device through the message application. For example, the device 1000 may obtain, through the message application, a message including "Do you go to Japan on vacation? Don't forget to buy a present for me." "OK, I will buy.", "Did you book a flight?", and "No, not yet." transmitted/received between the user (I) of the device 1000 and the other user (Susan) of the external device, and may analyze based on the obtained message that the user has to book a flight to Japan on vacation and has to buy a present for Susan. Accordingly, the device 1000 may determine "Japan", "Present", "Vacation", "Flight", and "Book" as the keywords 820, based on the analysis. The device 1000 may generate "Japan", "Present", "Vacation", "Flight", and "Book" that are the determined keywords 820 for the keyword list 810, and may display the keyword list 810 on the execution screen 801 of the message application. In this case, the device 1000 may display a GUI for selecting at least one from among the keywords 820 in the keyword list 810. An operation of selecting and editing at least one of the keywords 820 in the keyword list 810 through the GUI will be explained below with reference to FIG. 6.

Figure 5:
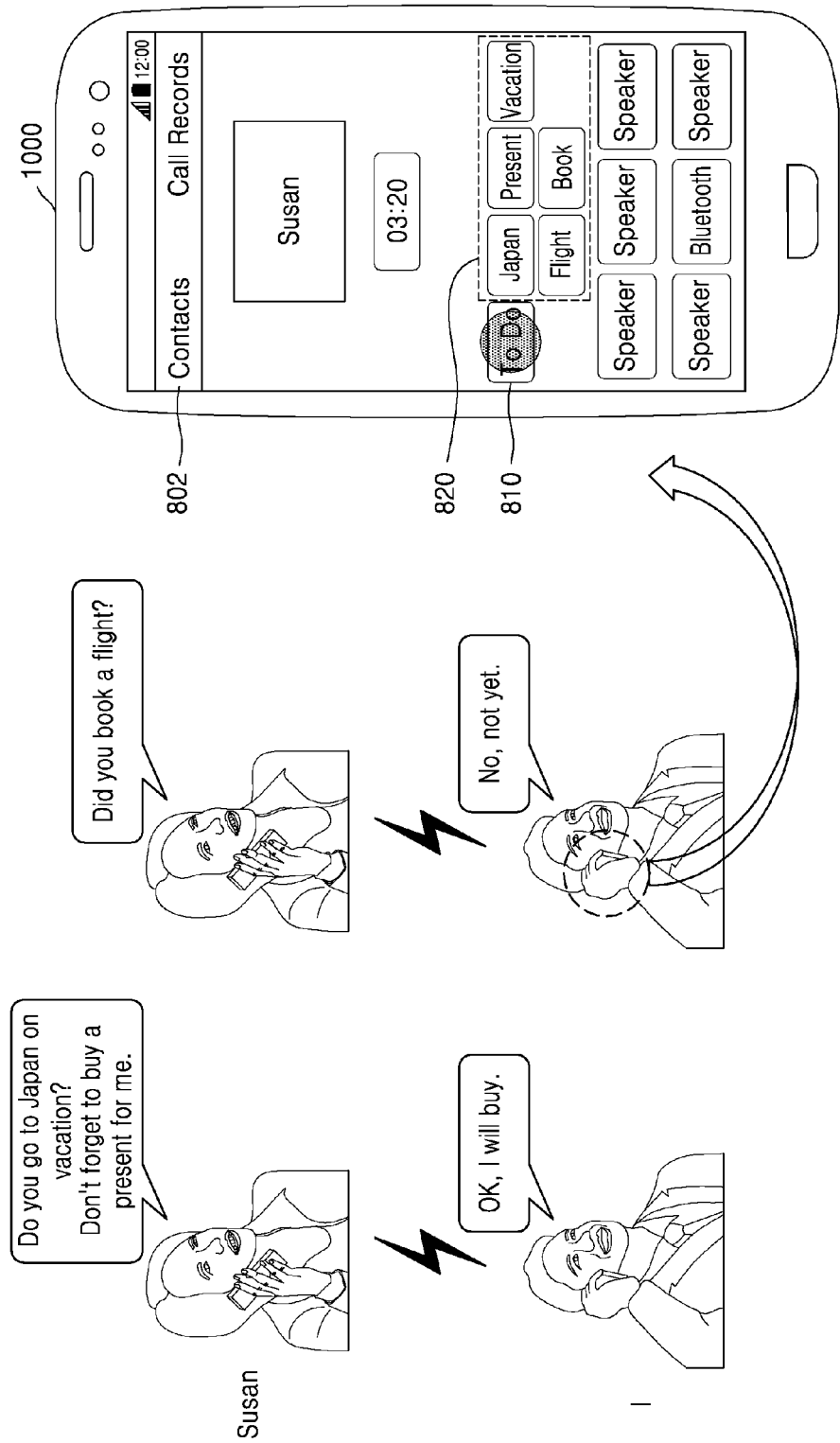
FIG. 5 is a view illustrating an example where a device displays a keyword list on an execution screen of a call application, according to an embodiment.

FIG. 5 is a view illustrating an example where the device 1000 displays the keyword list 810 on an execution screen 802 of a call application, according to an example embodiment.

Referring to FIG. 5, for example, the device 1000 may record call voice including "Do you go to Japan on vacation? Don't forget to buy a present for me." "OK, I will buy.", "Did you book a flight?", and "No, not yet." made between the user (I) of the device 1000 and the other user (Susan) of the external device. The device 1000 may convert the recorded call voice into text, and may analyze based on the text that the user has to book a flight to Japan on vacation and has to buy a present for Susan. Accordingly, the device 1000 may determine "Japan", "Present", "Vacation", "Flight", and "Book" as the keywords 820, based on the analysis. The device 1000 may generate the keywords 820 as the keyword list 810, and may display the keyword list 810 on the execution screen 801 of the call application.

Figure 6:
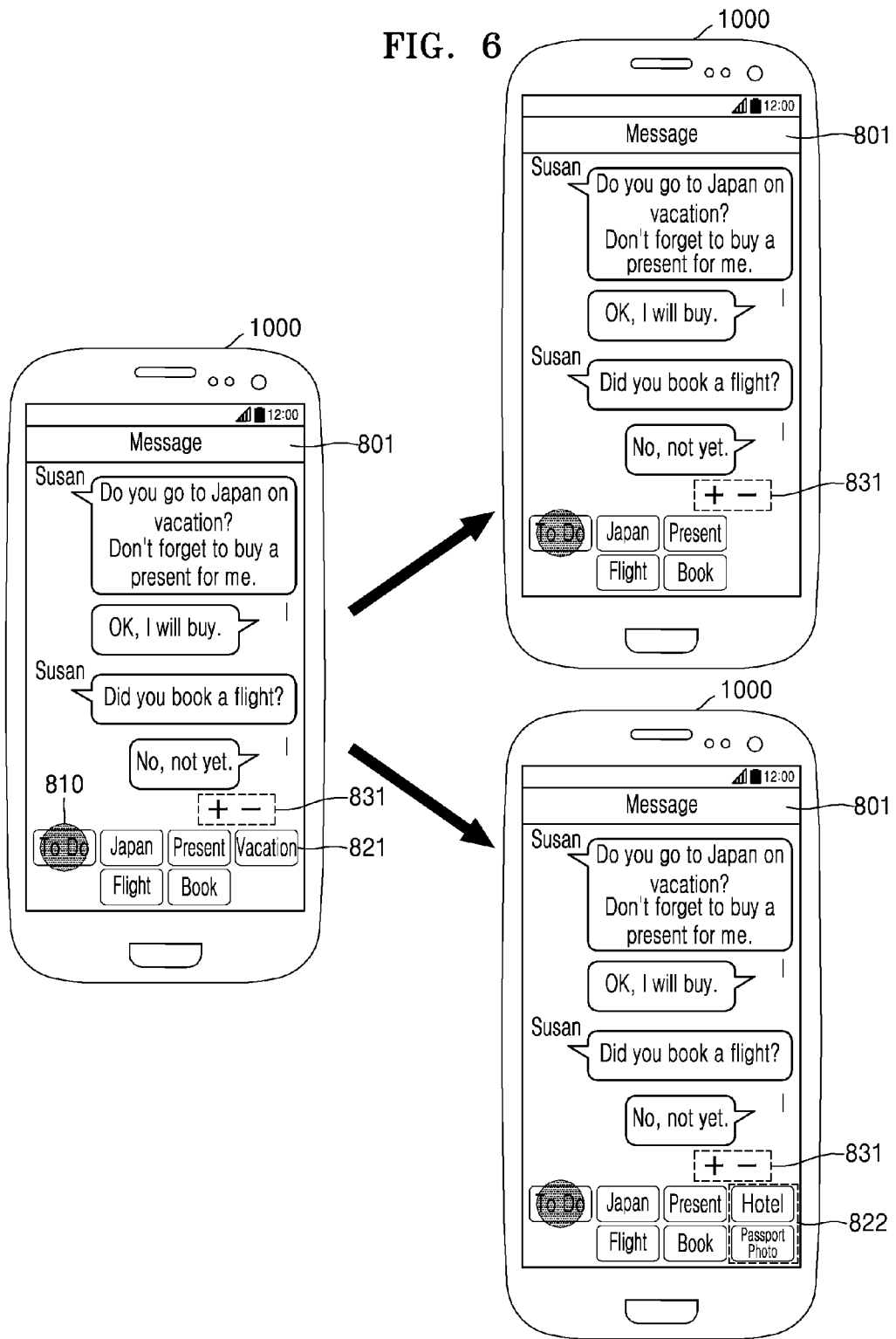
FIG. 6 is a view illustrating an example where a device edits a keyword list according to an input of a user through a graphical user interface (GUI), according to an embodiment.

FIG. 6 is a view illustrating an example where the device 1000 edits a keyword list according to an input of a user through a GUI, according to an example embodiment.

Referring to FIG. 6, the device 1000 may display a GUI for selecting at least one keyword in a keyword list including "Japan", "Present", "Vacation", "Flight", and "Book" as keywords, on the execution screen 801 of a message application. For example, the device 1000 may display "+" and "−" 830 over the keyword list.

The device 1000 may receive an input that selects "−" and an input that removes "Vacation" 821 from the keyword list through the GUI. The input that selects "−" may be, but is not limited to, a touch signal, and the input that removes "Vacation" 821 may be, but is not limited to, a drag-and-drop signal. A drag refers to a touch gesture made by moving a touch point from one location to another location, and may include various gestures using dragging such as flick, sweep, swipe, pinch, and rotate. The device 1000 may remove "Vacation" from the keyword list by controlling a display and may display the keyword list including "Japan", "Present", "Flight", and "Book" as keywords on an execution surface of the display.

Also, the device 1000 may receive an input that selects "+" through the GUI. In this case, the device 1000 may display a keyboard interface on the execution surface of the display to input or modify a keyword. The user may additionally insert "Hotel" and "Passport Photo" 822 into the keyword list through the keyboard interface. The device 1000 may display the keyword list including "Japan", "Present", "Flight", "Book", "Hotel", and "Passport Photo" as keywords on the execution surface of the display.

Figure 7:
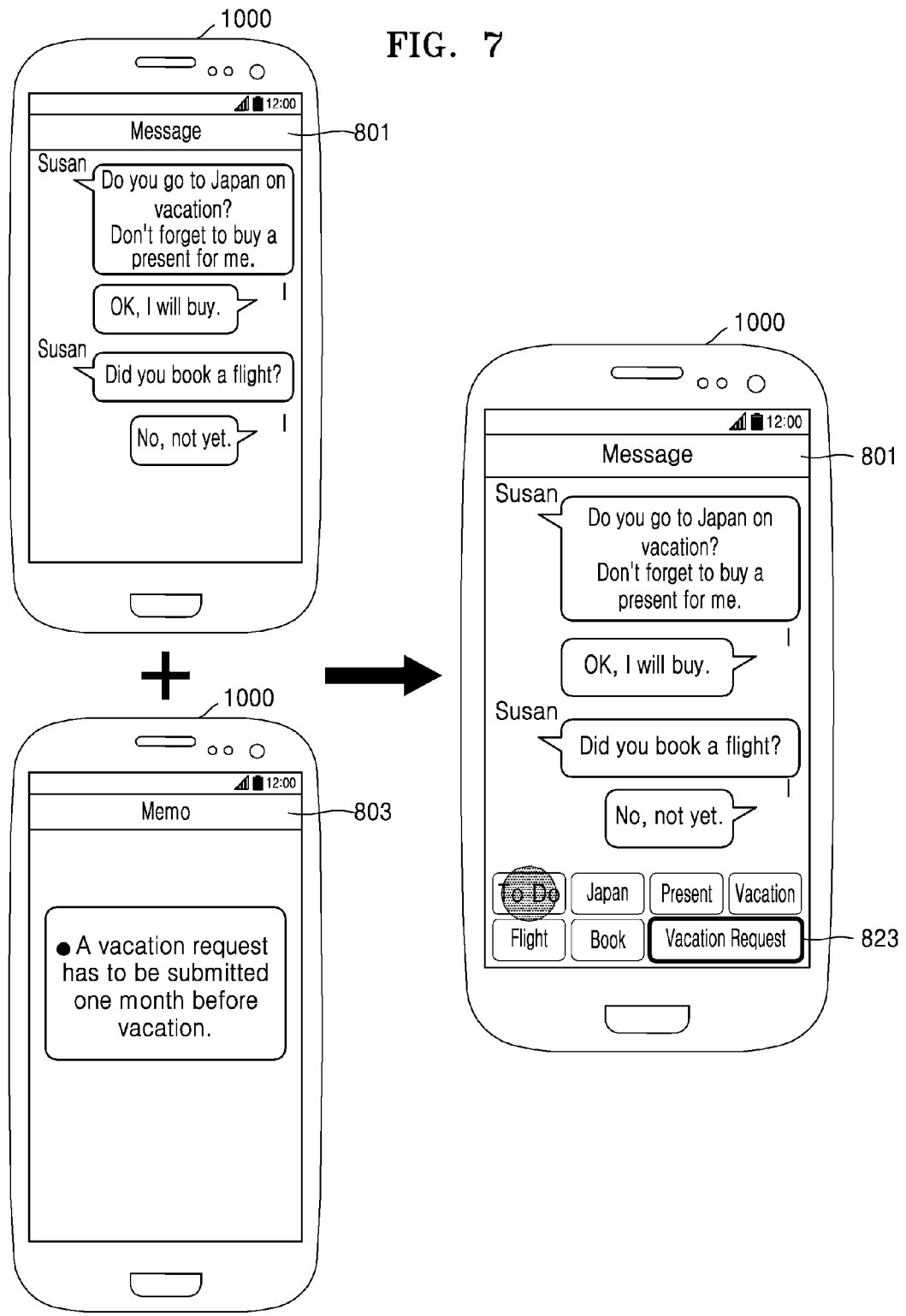
FIG. 7 is a view illustrating an example where a device displays a keyword list on an execution screen of an application that is being executed on the display, based on data obtained from a plurality of applications, according to an embodiment.

FIG. 7 is a view illustrating an example where the device 1000 displays a keyword list on an execution screen of an application that is being executed on a display, based on data obtained from a plurality of applications, according to an example embodiment.

As described above with reference to FIG. 4, the device 1000 may display a message transmitted/received between the user (I) and another user (Susan) on the execution screen 801 of a message application by executing the message application. The device 1000 may analyze that the user has to book a flight to Japan on vacation and has to be buy a present for Susan, based on the message obtained by the message application. Accordingly, the device 1000 may determine "Japan", "Present", "Vacation", "Flight", and "Book" as keywords, based on the analysis.

Before generating a keyword list by using the determined keywords, the device 1000 may obtain data related to a first item in the keyword list from another application installed in the device 1000. The term 'item' used herein may refer to a material commonly applicable between one or more keywords in the keyword list. The device 1000 may additionally generate a keyword related to the first item, based on the data obtained from the other application. For example, the device 1000 may determine that an item of the keywords "Japan", "Present", "Vacation", "Flight", and "Book" is "Travel", and may determine whether data related to "Travel" is stored in the device 1000. The device 1000 may additionally generate a keyword related to "Travel", based on the data related to "Travel" stored in the device 1000. The device 1000 may obtain text saying that "a vacation request has to be submitted one month before vacation" from a notepad application 803, and may generate "Vacation Request" 823 as an additional keyword. The device 1000 may generate "Japan", "Present", "Vacation", "Flight", "Book", and "Vacation Request" 823 as a keyword list, and may display the keyword list on an execution screen of the display.

Figure 8:
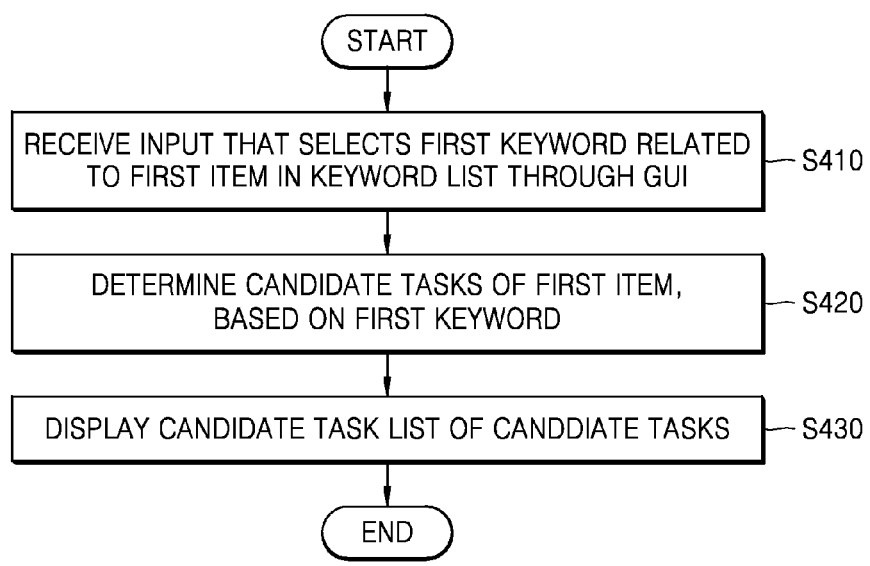
FIG. 8 is a flowchart of a method by which a device generates a candidate task list according to an embodiment.

FIG. 8 is a flowchart of a method by which the device 1000 generates a candidate task list according to an example embodiment.

In operation S410, the device 1000 may receive an input that selects a first keyword related to a first item in a keyword list through a GUI. The term "item" may refer to a material commonly applicable between one or more keywords in the keyword list. For example, the keyword list may include "Flight", "Hotel", "Rental Car", "Book", and "Airline Website". The device 1000 may determine a keyword item of "Flight", "Book", and "Airline Website" as "Flight Reservation". The device 1000 may receive a touch signal made when a user selects the first keyword related to the first item on a screen of a display.

Also, the device 1000 may receive an input that modifies, adds, or removes a keyword from the keyword list through the GUI. For example, the device 1000 may receive an input signal for removing a second keyword not related to the first item from the keyword list. The input signal may be a touch signal or a drag-and-drop signal. Alternatively, the device 1000 may display an icon on an execution screen of the display so that the user may directly input or modify a keyword in the keyword list. When the user touches the icon, the device 1000 may display a keyboard interface on the execution screen of the display so that the user may directly input or modify a keyword related to the first item. The device 1000 may receive a keyword used to determine tasks through the keyboard interface.

In operation S420, the device 1000 may determine one or more candidate tasks for the first item based on the selected first keyword. The device 1000 may determine one or more candidate tasks by combining all or some of the selected first keyword, data related to the first keyword obtained by at least one application installed in the device 1000, and data related to the first keyword obtained from the server 2000. The server 2000 may be, but is not limited to, a service providing server to which the user has subscribed. The one or more candidate tasks may be provided as sentences by combining all or some of the pieces of data related to the first keyword.

Also, when a plurality of keywords are selected, the device 1000 may classify the plurality of keywords into categories for items, and may determine one or more candidate tasks by combining all or some of keywords in the same category.

In operation S430, the device 1000 may display a candidate task list of the determined candidate tasks. The device 1000 may classify the determined plurality of candidate tasks into categories for items, may group candidate tasks belonging to the same category, and may generate a candidate task list of each group.

Also, the device 1000 may classify the determined plurality of candidate tasks according to schedules of the user, may group candidate tasks belonging to the same schedule, and may generate a candidate task list of each group. The device 1000 may display the generated candidate task list.

Figure 9:
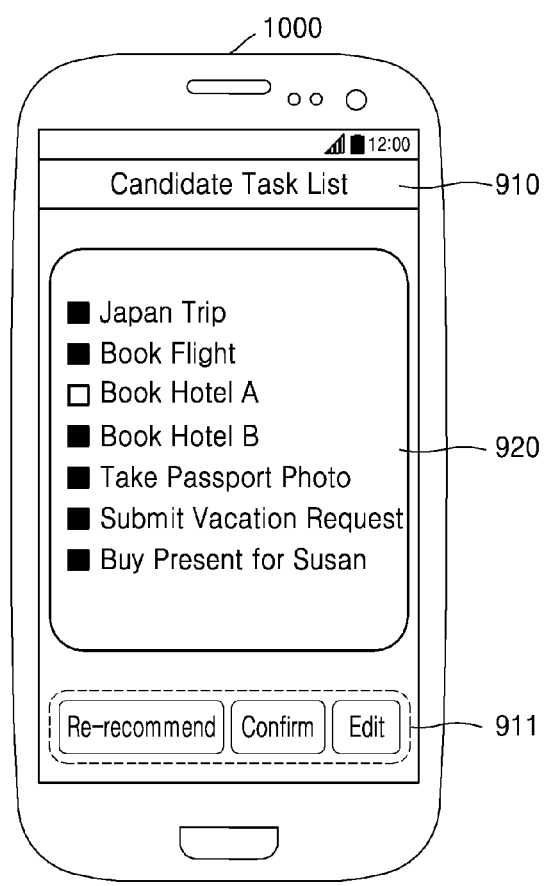
FIG. 9 is a view illustrating an example where a device displays a candidate task list, according to an embodiment.

FIG. 9 is a view illustrating an example where the device 1000 displays a candidate task list 910, according to an example embodiment.

The device 1000 may determine candidate tasks 920 for a first item, by combining all or some of a first keyword selected by a user, data related to the first keyword obtained by a plurality of applications installed in the device 1000, and data related to the first keyword obtained from the server 2000. The server 2000 may be, but is not limited to, a service providing server to which the user subscribes.

As described with reference to FIG. 7, the device 1000 may determine an item as "Japan Trip" by using "Japan", "Present", "Vacation", "Flight", "Book", and "Vacation Request" that are keywords selected by the user, data related to the selected keywords obtained from the plurality of applications installed in the device 1000, and data related to the keywords obtained from the server 2000, and may determine "Japan Trip", "Book Flight", "Book Hotel A", "Book Hotel B", "Take Passport Photo", "Submit Vacation Request", and "Buy Present for Susan" as the candidate tasks 920 for the candidate task list.

The device 1000 may display the candidate task list 910 of the candidate tasks 920. In this case, the device 1000 may display a screen, which displays the candidate task list 910, on an execution screen of an application or as a separate execution screen. Also, the device 1000 may display a GUI 911 for editing the candidate task list 910. For example, the device 1000 may display the GUI 910 for re-recommending, confirming, or editing the candidate tasks 920.

Figure 10:
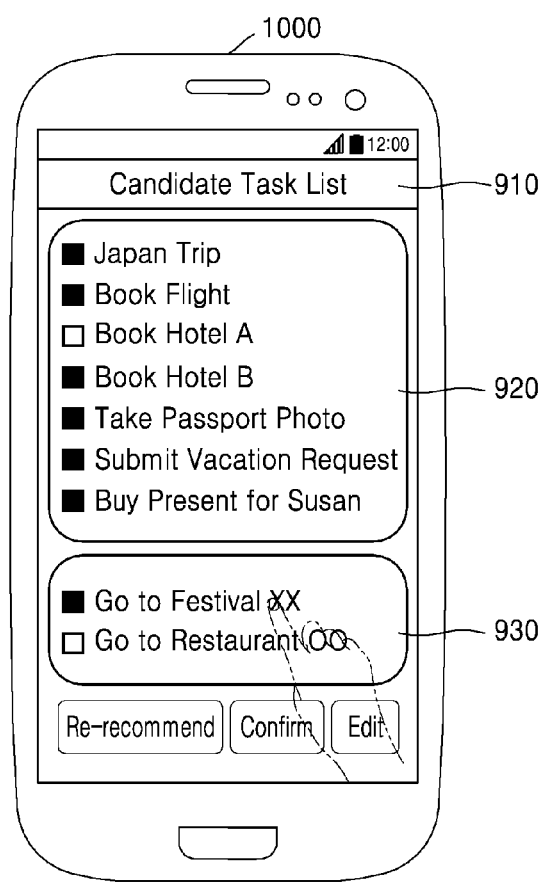
FIG. 10 is a view illustrating an example where a device displays a candidate task list, according to another embodiment.

FIG. 10 is a view illustrating an example where the device 1000 displays the candidate task list 910, according to another example embodiment.

The device 1000 may obtain not only keywords selected by a user but also additional keywords from the server 2000 that is a service providing server to which the user has subscribed. The additional keywords are keywords related to an item of the selected keywords. As described with reference to FIG. 9, when the keywords are "Japan", "Present", "Vacation", "Flight", "Book", and "Vacation Request", the device 1000 may determine "Japan Trip" as an item of the keywords, and may determine "Attraction in Japan" and "Restaurant in Japan" related to "Japan Trip" as the additional keywords.

The device 1000 may determine candidate tasks 930 related to the item based on the additional keywords. The device 1000 may determine "Go to Festival XX" and "Go to Restaurant OO" related to "Attraction in Japan" as the candidate tasks 930, based on "Attraction in Japan" and "Restaurant in Japan".

The device 1000 may display the candidate tasks 930 determined based on the additional keywords obtained from the server 2000 on an execution screen of a display to be distinguished from the candidate tasks 920 determined based on the keywords selected by the user. For example, as shown in FIG. 10, the device 1000 may display the candidate tasks 920 determined based on the keywords selected by the user on an upper portion of the execution screen, and may display the candidate tasks 930 determined based on the additional keywords obtained from the server 2000 on a lower portion of the execution screen.

Also, when the device 1000 receives an input (e.g., a touch signal) that selects candidate tasks in the candidate task list 910 through the execution screen of the display, the device 1000 may provide information related to the selected candidate tasks. For example, when the device 1000 receives an input that selects "Go to Festival XX", the device 1000 may provide "how to go to the festival XX", "a period during which the festival XX is held", "how to book the festival XX", and "link information related to the festival XX". In this case, the device 1000 may receive information related to "Go to Festival XX" from the server 2000.

Figure 11:
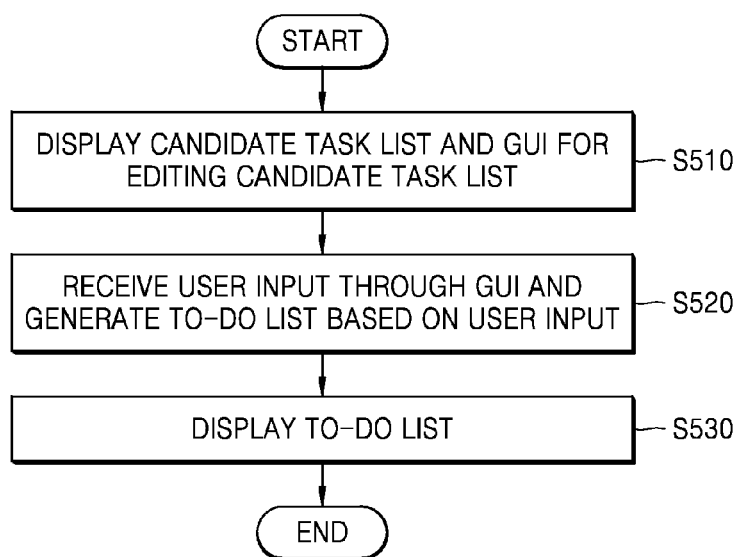
FIG. 11 is a flowchart of a method by which a device generates a to-do list according to an embodiment.

FIG. 11 is a flowchart of a method by which the device 1000 generates a to-do list according to an example embodiment.

In operation S510, the device 1000 may display a candidate task list and a GUI for editing the candidate task list.

In operation S520, the device 1000 may receive a user input through the GUI for editing the candidate task list, and may generate a to-do list based on the user input. The device 1000 may generate the to-do list including at least one main task and at least one sub-task subordinate to the at least one main task, based on the candidate task list and the user input. Also, the device 1000 may determine tasks to be performed by a user in the candidate task list, based on the candidate task list and the user input. The device 1000 may determine a task of an upper element from among the determined tasks as the main task, and may determine a task of a lower element corresponding to the upper element as the sub-task.

For example, when an item of the candidate task list is related to "Japan Trip", the candidate task list may include "Book Flight", "Book Hotel", "Search for Destination", "Book Flight of Airline A", "Book Flight of Airline B", "Set Travel Date", "Rent Car", "Access Hotel Comparison Website", "Visit Attraction C", and "Visit Restaurant in Area E". In this case, the device 1000 may determine "Book Flight" as a first main task, and may determine "Book Flight of Airline A", "Book Flight of Airline B", and "Set Travel Date" as sub-tasks of the first main task. Also, the device 1000 may determine "Book Hotel" as a second main task, and may determine "Access Hotel Comparison Website" as a sub-task of the second main task. Also, the device 1000 may determine "Search for Destination" as a third main task, and may determine "Visit Attraction C" and "Visit Restaurant in Area E" as sub-tasks of the third main task. Also, the device 1000 may determine "Rent Car" as a main task, and may determine "Rent Car" as a sub-task of the first through main tasks.

In operation S530, the device 1000 may display the generated to-do list. Also, the device 1000 may output notification information related to a first task at a time when the first task in the to-do list has to be performed. The device 1000 may display the notification information on an execution screen of a display, or may output the notification information as a voice signal.

Figure 12:
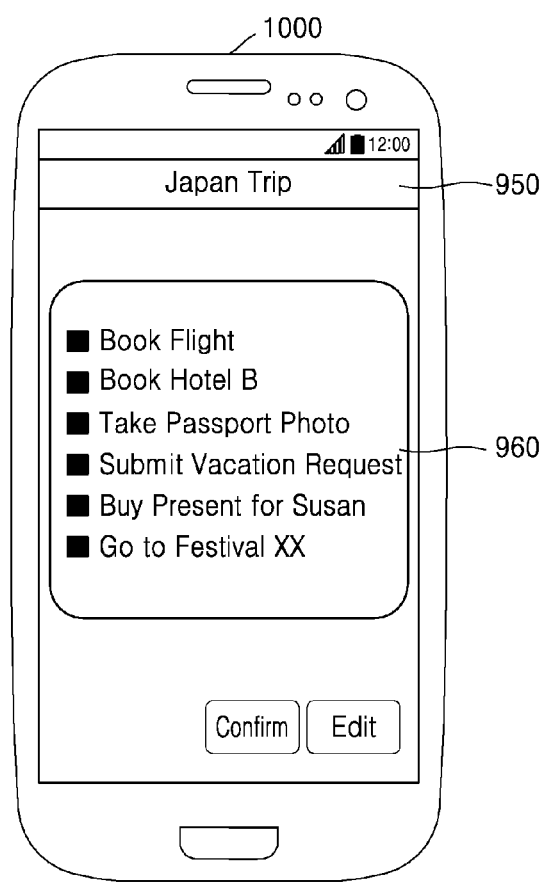
FIG. 12 is a view illustrating an example where a device displays a to-do list, according to an embodiment.

FIG. 12 is a view illustrating an example where the device 1000 displays a to-do list, according to an example embodiment.

As shown in FIG. 10, a user may select "Japan Trip", "Book Flight", "Book Hotel B", "Take Passport Photo", "Submit Vacation Request", "Buy Present for Susan", and "Go to Festival XX" in a candidate task list as tasks. In this case, the device 1000 may receive a touch signal that selects tasks in the candidate task list through a GUI on an execution screen of a display.

Referring to FIG. 12, the device 1000 may form the tasks selected by the user as a to-do list 960 and may display the to-do list 960 on the execution screen of the display. For example, the device 1000 may display the to-do list 960 related to "Japan Trip" 950 on the execution screen of the display. Also, the device 1000 may display a GUI for editing a task in the to-do list 960 on the execution screen of the display.

Figure 13:
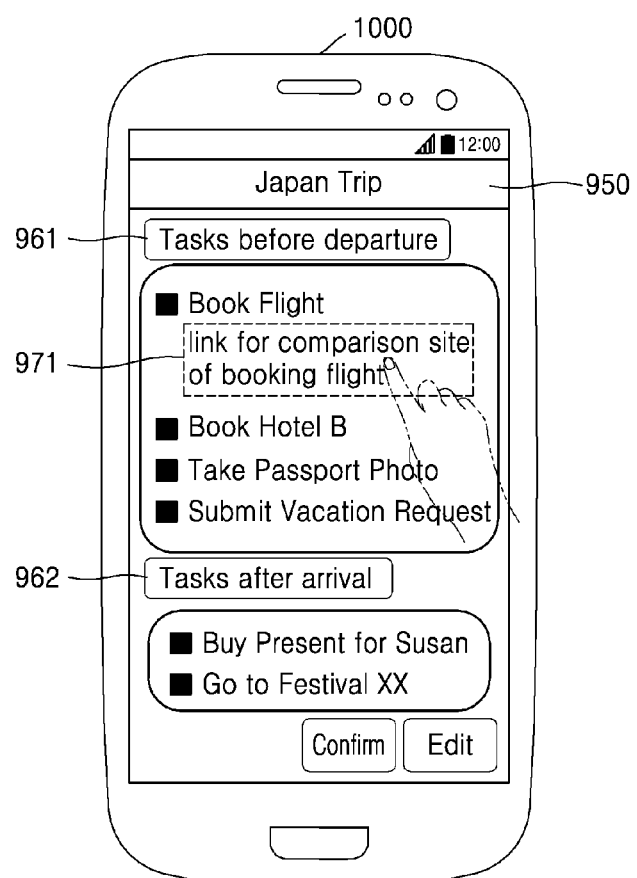
FIG. 13 is a view illustrating an example where a device displays a to-do list, according to another embodiment.

FIG. 13 is a view illustrating an example where the device 1000 displays a to-do list, according to another example embodiment.

Referring to FIG. 13, when "Japan Trip", "Book Flight", "Book Hotel B", "Take Passport Photo", "Submit Vacation Request", "Buy Present for Susan", and "Go to Festival XX" are determined as tasks in a to-do list of a user, the device 1000 may classify the tasks in the to-do list into a task 961 before departure and a task 962 after arrival. The device 1000 may determine the task 961 before departure as a first main task, and may determine "Book Flight", "Book Hotel B", "Take Passport Photo", and "Submit Vacation Request" as sub-tasks of the first main task. Also, the device 1000 may determine the task 962 after arrival as a second main task, and may determine "Buy Present for Susan" and "Go to Festival XX" as sub-tasks of the second main task. As shown in FIG. 13, the device 1000 may display the task 961 before departure and the task 962 after arrival so that "Book Flight", "Book Hotel B", "Take Passport Photo", and "Submit Vacation Request" that are the sub-tasks of the task 961 before departure are distinguished from "Buy Present for Susan" and "Go to Festival XX" that are the sub-tasks of the task 962 after arrival.

Also, the device 1000 may display a link 971 for providing additional information related to a sub-task in the to-do list, along with the sub-task.

Figure 14:
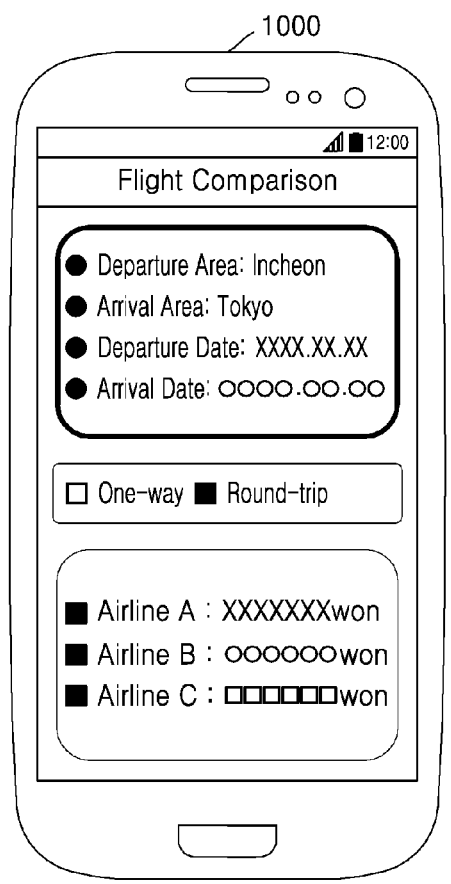
FIG. 14 is a view illustrating an example where a device provides additional information related to tasks in a to-do list, according to an embodiment.

FIG. 14 is a view illustrating an example where the device 1000 provides additional information related to tasks in a to-do list, according to an example embodiment.

Referring to FIG. 14, a user may access a flight comparison website and may compare prices of airlines to book a flight. The device 1000 may display "Flight Comparison Website" under "Book Flight". When the user selects "Flight Comparison Website", as shown in FIG. 14, the device 1000 may access a flight comparison website. The user may input travel information on the flight comparison website and may compare prices of flights of airlines.

Figure 15:
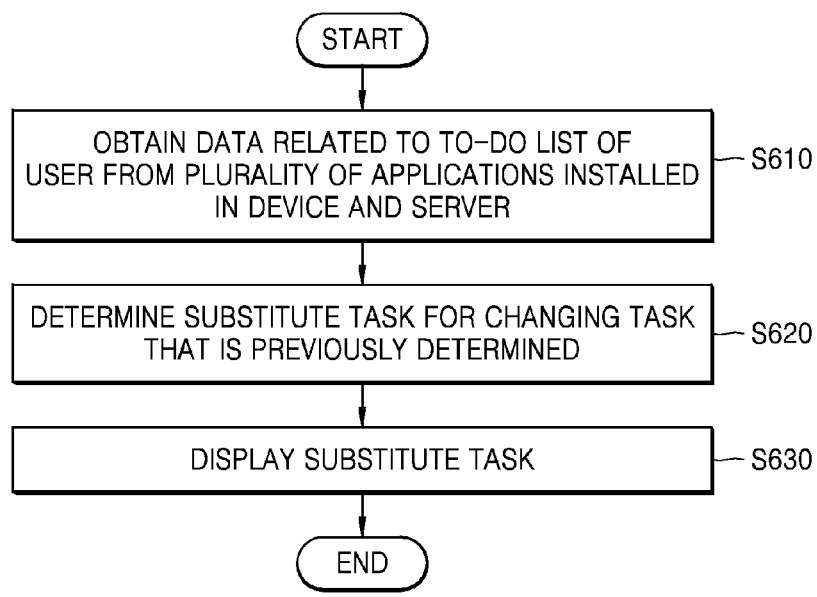
FIG. 15 is a flowchart of a method by which a device provides a task to replace a task that is previously determined according to an embodiment.

FIG. 15 is a flowchart of a method by which the device 1000 provides a task that may replace a task that is previously determined according to an example embodiment.

In operation S610, the device 1000 may obtain data related to a to-do list of a user from a plurality of applications installed in the device 1000 and the server 2000.

In detail, the device 1000 may obtain data about call voice between a user and another user from a call application in the device 1000. When the call application is executed and a call is made between the user and the other user, the device 1000 may record the call voice. The device 1000 may convert the recorded call voice into text and may obtain the text. Also, the device 1000 may transmit the recorded call voice to the server 2000, and may receive text converted from the call voice from the server 2000.

Also, the device 1000 may receive a message transmitted/received between the user and the other user from a message application. The device 1000 may execute the message application in the device 1000 and may obtain a message transmitted/received as a message is transmitted/received to/from the other user. Examples of the message application may include, but are not limited to, a chatting application, an SMS/MMS sending/receiving application, a messenger application, and a social network service (SNS) application. Aldo, the device 1000 may obtain text of an e-mail transmitted/received by the device 1000. In this case, the device 1000 may obtain text of the e-mail from an e-mail sending/receiving application or a web browser executed in the device 1000.

Also, the device 1000 may obtain data about a schedule of the user through a schedule management application of the user installed in the device 1000. Also, the user may record schedule information of the user on a service providing server by using a service of the service providing server, and the device 1000 may receive the schedule information of the user stored in the service providing server from the service providing server. In this case, the device 1000 may receive the schedule information of the user from the service providing server by using a user ID of the service providing server. Also, the user may input the schedule information of the user to another device 1000 of the user, and the device 1000 may obtain memo information of the user from the other device 1000.

Also, the device 1000 may collect log information of an application executed in the device 1000. The log information may indicate which operation has been performed by the application executed in the device 1000 based on a user input. The device 1000 may collect pieces of log information about a detailed operation of the executed application, and may obtain data used to determine whether a task of the user has been performed.

In operation S620, the device 1000 may determine a substitute task for changing a task that is previously determined. The device 1000 may obtain data related to a first task in a to-do list, and may determine a substitute task for changing the first task. For example, it is assumed that the first task is "Today, Go Shopping at Market A near Home". The device 1000 may obtain information saying "Today the market A is closed" from the service providing server to which the user subscribes or an application installed in the device 1000. In this case, the device 1000 may obtain information about the market B near the user's home from the service providing server or the application installed in the device 1000, and may determine "Go Shopping at Market B near Home" as a substitute task.

Also, the device 1000 may determine whether the user may not perform another task in the to-do list when the first task is changed to a substitute task. When it is determined that the user may not perform the other task, the device 1000 may also determine a substitute task of the other task.

In operation S630, the device 1000 may display the determined substitute task. Also, the device 1000 may update the to-do list by changing the task that is previously determined to the substitute task. The device 1000 may output notification information about the substitute task before a time when the task that is previously determined has to be performed. The device 1000 may display the notification information on an execution screen of a display, or may output the notification information as a voice signal.

Figure 16:
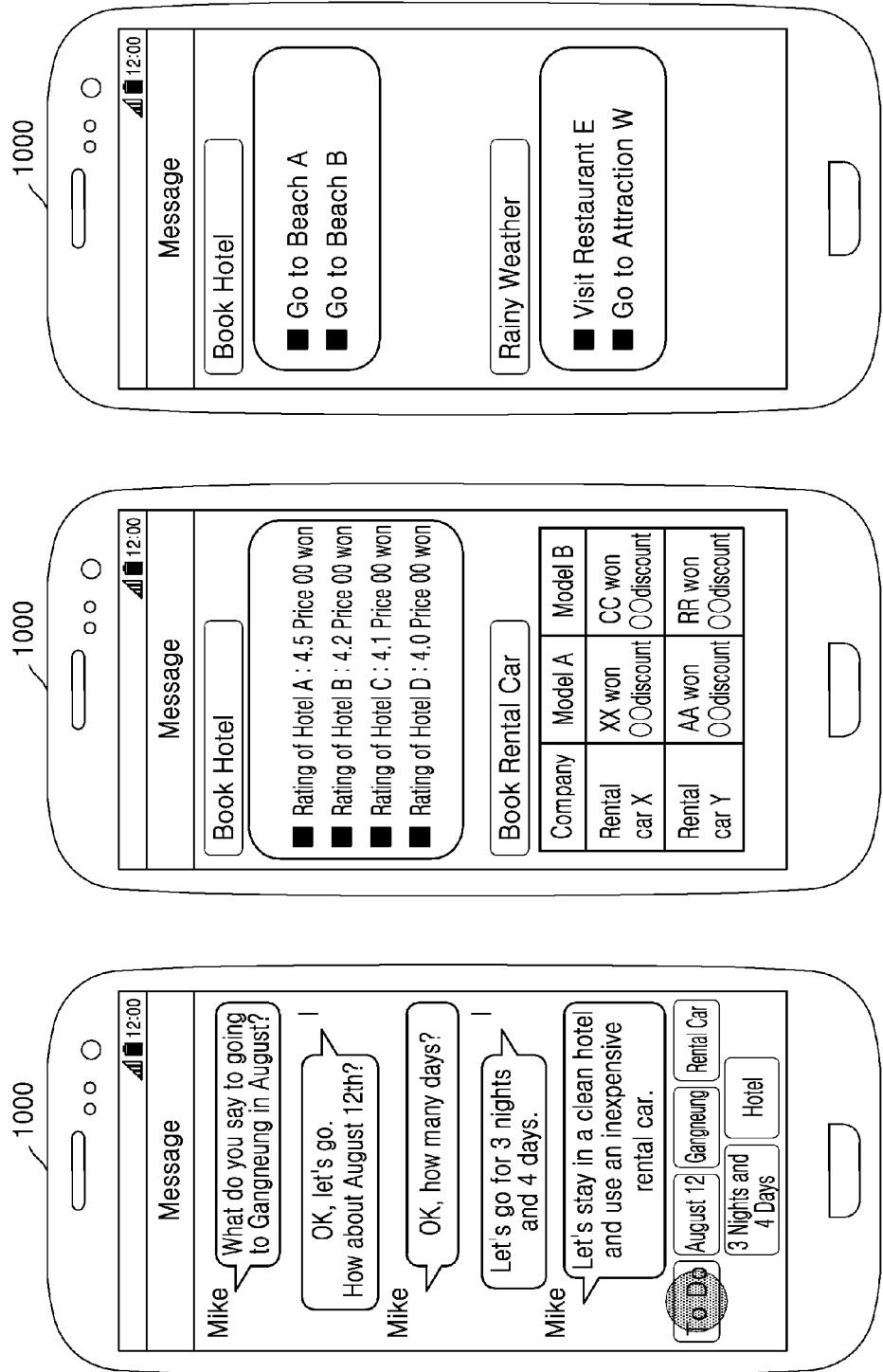
FIG. 16 is a view illustrating an example where a device provides a candidate task of a sub-task by recognizing a user's intention and provides an additional task of the determined task, according to an embodiment.

FIG. 16 is a view illustrating an example where the device 1000 understands a user's intention, provides a candidate task of a sub-task, and provides an additional task of a determined task, according to an example embodiment.

Referring to FIG. 16, the device 1000 may display a message transmitted/received through a message application between a user (I) of the device 1000 and another user (Mike) of an external device on an execution screen of a message application. The device 1000 may obtain a message including "What do you say to going to Gangneung in August?", "OK, let's go.", "How about August 12th?", "OK, how many days?", "Let's go for 3 nights and 4 days.", and "Let's stay in a clean hotel and use an inexpensive rental car." through the message application, and may analyze, based on the obtained message, that the user (I) and the other user (Mike) of the external device plan to go to Gangneung on August 12 for 3 nights and 4 days and prefer a clean hotel and an inexpensive rental car. Accordingly, the device 1000 may determine "August 12", "Gangneung", "Rental Car", "3 Nights and 4 Days", and "Hotel" as keywords, based on the analysis. The device 1000 may generate "August 12", "Gangneung", "Rental Car", "3 Nights and 4 Days", and "Hotel" that are the determined keywords as a keyword list, and may display the keyword list on the execution screen of the message application. In this case, the device 1000 may display a GUI for editing at least one keyword in the keyword list on the execution screen of the display.

Also, the device 1000 may analyze the user's intention in the analysis. The device 1000 may determine candidate tasks of a first keyword by applying a result of the analysis of the user's intention to the first keyword. The device 1000 may determine candidate tasks by applying a weight to elements that may reflect the user's intention, and may generate a candidate task list.

Referring to FIG. 16, the device 1000 may determine "Book Hotel" and "Book Rental Car" as candidate tasks, based on the keyword list including "August 12", "Gangneung", "Rental Car", "3 Nights and 4 Days", and "Hotel". Regarding "Book Hotel", the device 1000 may provide a hotel list including hotel information arranged in a descending order of ratings compared to price, by reflecting the intention that the user (I) and the other user (Mike) of the external device want a clean hotel. In this case, the device 1000 may generate the hotel list by applying a weight to price and ratings. The device 1000 may obtain the hotel list from data stored in the device 1000 or from a service providing server to which the user subscribes.

Also, regarding "Book Rental Car", the device 1000 may provide a rental car list including car models of rental car companies arranged in a descending order of car performance compared to price, by reflecting the intention that the user (I) and the other user (Mike) of the external device prefer an inexpensive rental car. The device 1000 may generate the rental car list by applying a weight to price and car performance. The device 1000 may obtain the rental car list from data stored in the device 1000 or from the service providing server to which the user subscribes.

Also, the device 1000 may provide an additional task in consideration of a plurality of situations that may occur when the user performs tasks in the to-do list. For example, as shown in FIG. 16, while the user (I) and the other user (Mike) of the external device travel in Gangneung, in consideration of a situation where it may be hot or rainy, the device 1000 may provide a task list (e.g., Go to Beach A and Go to Beach B) that may be performed when it is hot, and may provide a task list (e.g., Visit Restaurant E and Go to Attraction W) when it is rainy.

Figure 17:
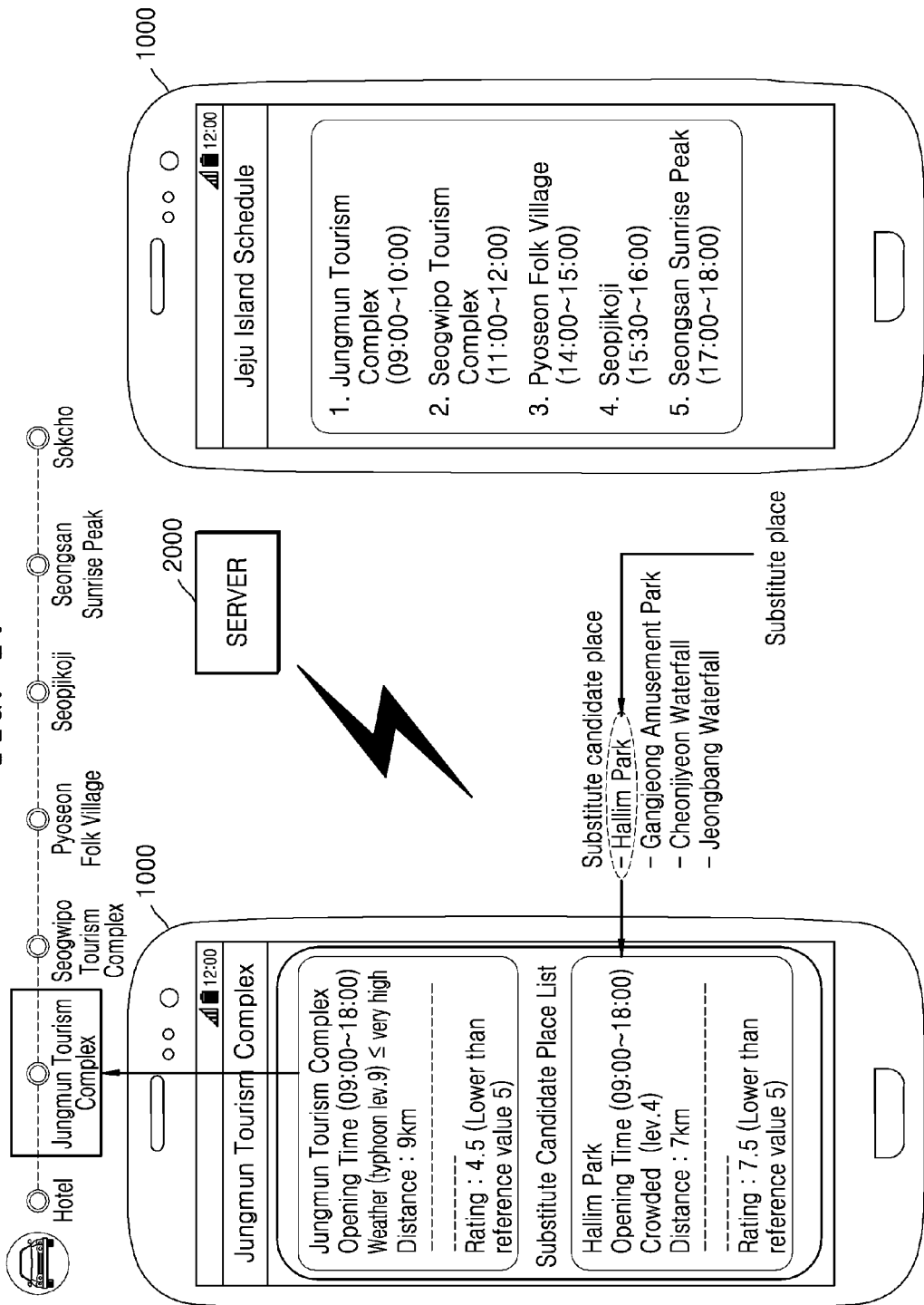
FIG. 17 is a view illustrating an example where a device provides a substitute task to replace a sub-task, according to an embodiment.

FIG. 17 is a view illustrating an example where the device 1000 provides a substitute task that may replace a sub-task, according to an example embodiment.

The device 1000 may determine at least one substitute task for changing at least one task in a to-do list, based on data obtained by a plurality of applications installed in the device 1000 and data obtained from the server 2000 that is a service providing server to which a user subscribes, and may update tasks in the to-do list by reflecting the determined at least one substitute task.

Referring to FIG. 17, while the user travels in Jeju, the device 1000 may provide schedule information of the user. A schedule of the user for the second day may sequentially include Jungmun Tourism Complex, Seogwipo Tourism Complex, Pyoseon Folk Village, Seopjikoji, and Seongsan Sunrise Peak. By checking the schedule of the user, the device 1000 may obtain data that typhoon is expected to reach Jungmun Tourism Complex in the morning from a weather application installed in the device 1000 or the server 2000.

The device 1000 may obtain data about a candidate place to replace Jungmun Tourism Complex from an application installed in the device 1000 or the server 2000. The device 1000 may determine Hallim Park, Gangjeong Amusement Park, Cheonjiyeon Waterfall, and Jeongbang Waterfall as substitute candidate places, based on the obtained data. The device 1000 may provide an optimal substitute place to the user based on data about each substitute candidate place. For example, the device 1000 may collect data about a distance from a hotel, an opening time, crowd density, and weather of each substitute candidate place, and may provide an optimal substitute place based on the collected data. The device 1000 may apply a weight to each the distance from the hotel, the opening time, the crowd density, and the weather, and may calculate a rating. The device 1000 may provide "Hallim Park" having a highest rating from among ratings higher than a reference value as a substitute place.

Regarding the Jeju schedule, the device 1000 may change the task "Visit Jungmun Tourism Complex" to "Visit Hallim Park", and may update tasks in the to-do list. The device 1000 may display the updated to-do list.

Figure 18:
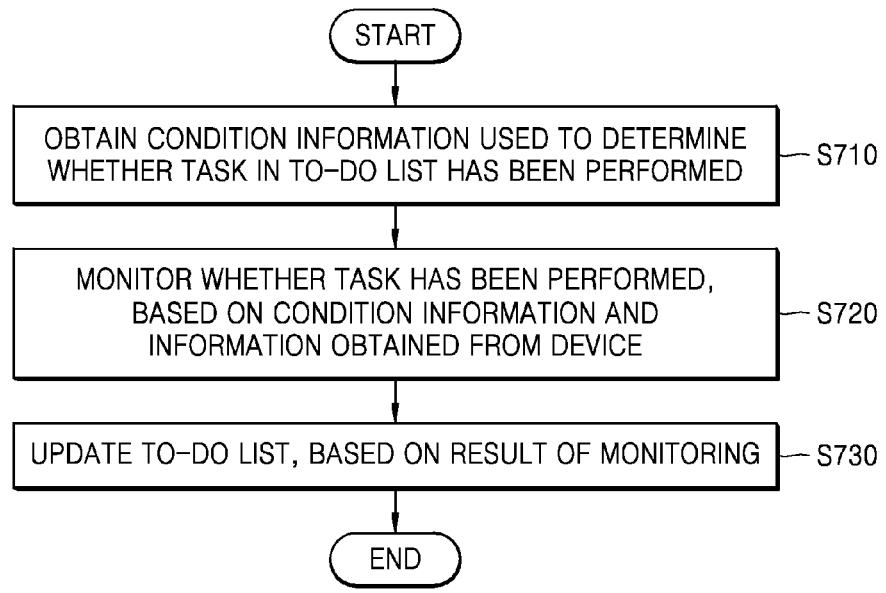
FIG. 18 is a flowchart of a method by which a device monitors whether a task in a to-do list has been performed according to an embodiment.

FIG. 18 is a flowchart of a method by which the device 1000 monitors whether a task in a to-do list has been performed according to an example embodiment.

In operation S710, the device 1000 may obtain condition information used to determine whether a task in a to-do list has been performed.

The device 1000 may obtain condition information used to determine whether a task in the to-do list has been performed from data obtained from a plurality of applications installed in the device 1000 and the server 2000. In this case, the condition information that is used to determine whether a predetermined task has been performed may be previously set. Examples of the condition information may include, but are not limited to, an application used to perform the predetermined task, operation information of a user related to the application, and detailed operation information of the application according to the operation information of the user.

That is, the device 1000 may determine detailed operations of the device 1000 for performing a first task in the to-do list and a relationship between the detailed operations.

In operation S720, the device 1000 may monitor whether a task in the to-do list has been performed, based on the condition information and information obtained from the device 1000. The device 1000 may determine whether a task in the to-do list has been performed, based on the condition indicating a relationship between detailed operations of the device 1000. The device 1000 may store first condition information used to determine whether the first task has been performed. The device 1000 may monitor whether the first task has been performed, based on information obtained from the device 1000 and the stored first condition information.

For example, when the first task is "Buy Water from Market", the device 1000 may determine whether the task "Buy Water from Market" has been performed based on location information of the user and/or payment information of the user. The condition information may include the location information of the user who arrives at the market from a GPS application and/or the payment information in a text message of the user transmitted to the device 1000.

In detail, when the location information obtained from the GPS application is information indicating a location of the market and text message information obtained from a message application includes "a payment for water", the device 1000 may determine that the first task has been performed.

In operation S730, the device 1000 may update the to-do list, based on a result of the monitoring. When it is determined as a result of the monitoring that a task in the to-do list has been performed, the device 1000 may remove the performed task from the to-do list. Also, when it is determined as a result of the monitoring that a task in the to-do list has not been performed, the device 1000 may output notification information indicating that the task has not been performed.

Figure 19:
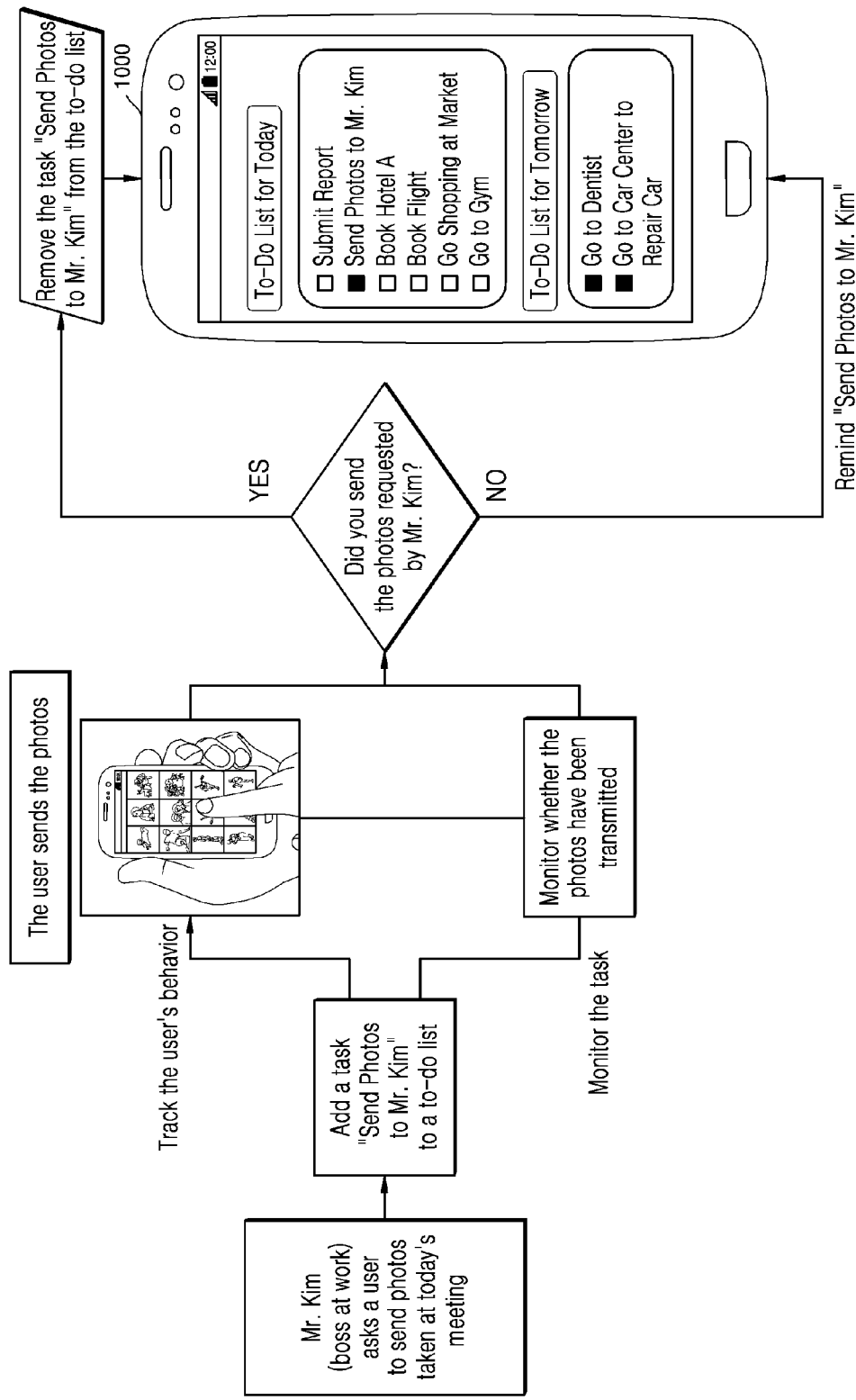
FIG. 19 is a view for explaining a process by which a device monitors whether a task in a to-do list has been performed, according to an embodiment.

FIG. 19 is a view for explaining a process by which the device 1000 monitors whether a task in a to-do list has been performed, according to an example embodiment.

Referring to FIG. 19, the device 1000 may obtain a message transmitted/received between a user of the device 1000 and another user of an external device through a message application in the device 1000. The device 1000 may analyze content of the obtained message as indicating that "Mr. Kim (boss at work) asks the user to send photos taken at today's meeting". The device 1000 may add a task "Send Photos to Mr. Kim" to a to-do list of the user.

The device 1000 may determine condition information used to determine whether the task "Send Photos to Mr. Kim" has been performed. For example, the device 1000 may determine a case where the message application in the device 1000 is executed, a person to/from which the user transmits/receives a message is Mr. Kim, and there is an operation by which the device 1000 select photos in a photo album in the device 1000 as the condition information.

The device 1000 may monitor an operation of an application related to the user's behavior. The device 1000 may monitor whether the message application in the device 1000 is executed. When the device 1000 detects that the message application is being executed, the device 1000 may determine a person to/from which the user transmits/receives a message is Mr. Kim, based on data obtained through the message application. When it is determined that the person to/from which the user transmits/receives a message is Mr. Kim, the device 1000 may determine whether there is an operation by which the device 1000 selects photos in the photo album in the device 1000. When it is determined that there is an operation by which the device 1000 selects photos in the photo album, the device 1000 may determine that the task "Send Photos to Mr. Kim" has been performed. In this case, the device 1000 may remove the task "Send Photos to Mr. Kim" from the to-do list of the user. In contrast, when any one item of the condition information is not satisfied, the device 1000 may determine that the task "Send Photos to Mr. Kim" has not been performed. In this case, the device 1000 may display a notification window showing "Send Photos to Mr. Kim" through an execution screen of a display.

Figure 20:
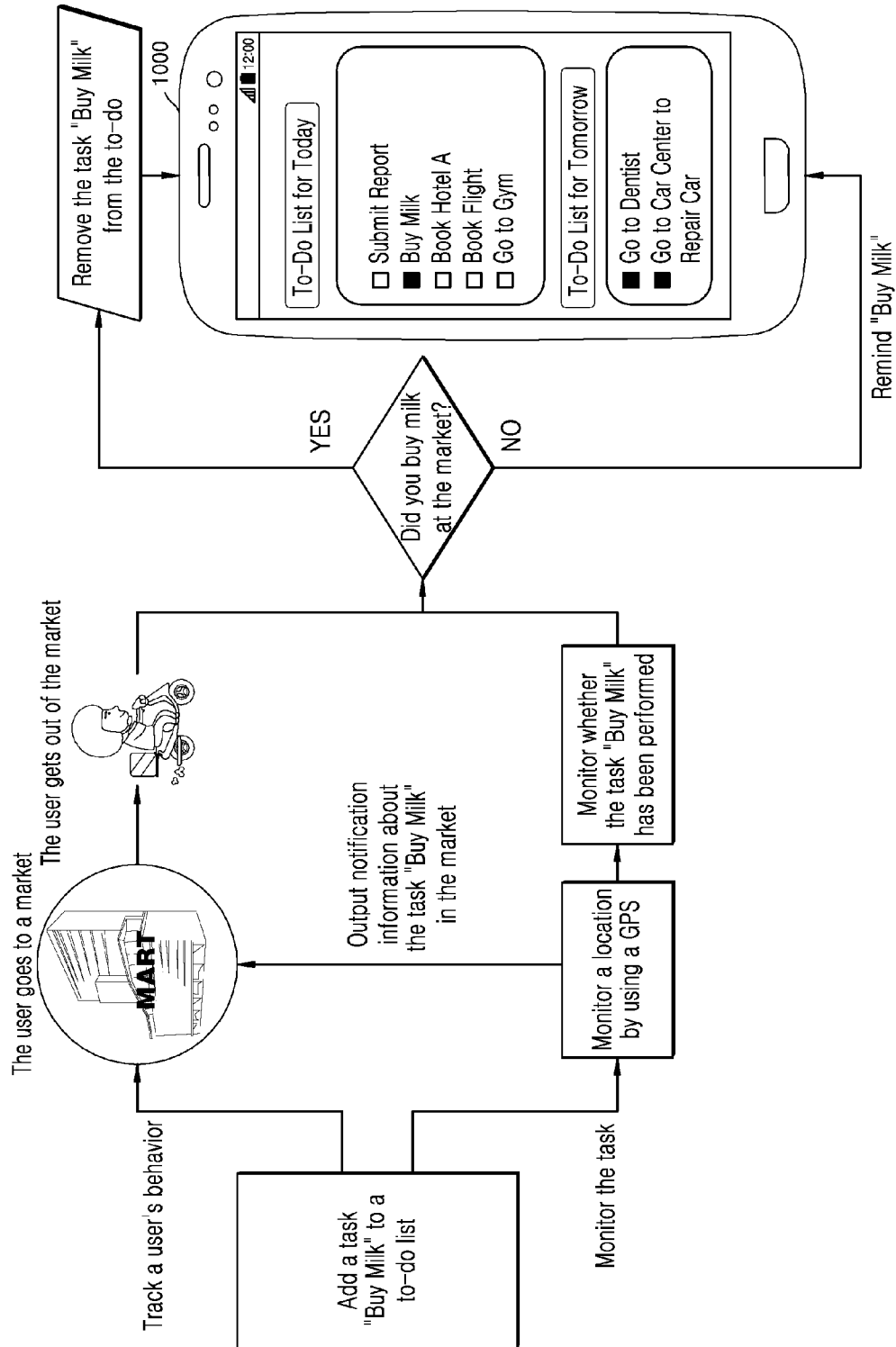
FIG. 20 is a view for explaining a process by which a device monitors whether a task in a to-do list has been performed, according to another embodiment.

FIG. 20 is a view for explaining a process by which the device 1000 monitors whether a task in a to-do list has been performed, according to another example embodiment.

Referring to FIG. 20, the device 1000 may add a task "Buy Milk" to a to-do list. The device 1000 may determine condition information used to determine whether the task "Buy Milk" has been performed. For example, the device 1000 may obtain data indicating location information of a user from a GPS application, and may determine a case where the data indicating the location information indicates a location of a market as condition information.

The device 1000 may monitor an operation of an application related to the user's behavior. The device 1000 may monitor the data indicating the location information of the user from the GPS application in the device 1000 in real time. When the device 1000 determines that information indicating the location information indicates a location of a market, the device 1000 may output notification information about the task "Buy Milk". The device 1000 may display the notification information on an execution screen window of a display, and may output the notification information as a voice signal. Also, when the device 1000 determines that the information indicating the location information indicates a location outside the market, the device 1000 may output the notification information indicating whether the task "Buy Milk" has been performed.

When the device 1000 sequentially obtains the data indicating the location of the market and the data indicating the location outside the market from the GPS application, the device 1000 may determine that the task "Buy Milk" has been performed, and may remove the task "Buy Milk" from the to-do list of the user.

Also, at a time when the device 1000 obtains the data indicating the location outside the location of the market, the device 1000 may output the notification information about whether the task "Buy Milk" has been performed, and may receive information about whether the task "Buy Milk" has been performed from the user. The device 1000 may determine whether the task "Buy Milk" has been performed according to the information. When it is determined that the task "Buy Milk" has not been performed, the device 1000 may display a notification window showing "Buy Milk" on the execution screen of the display.

Figure 21:
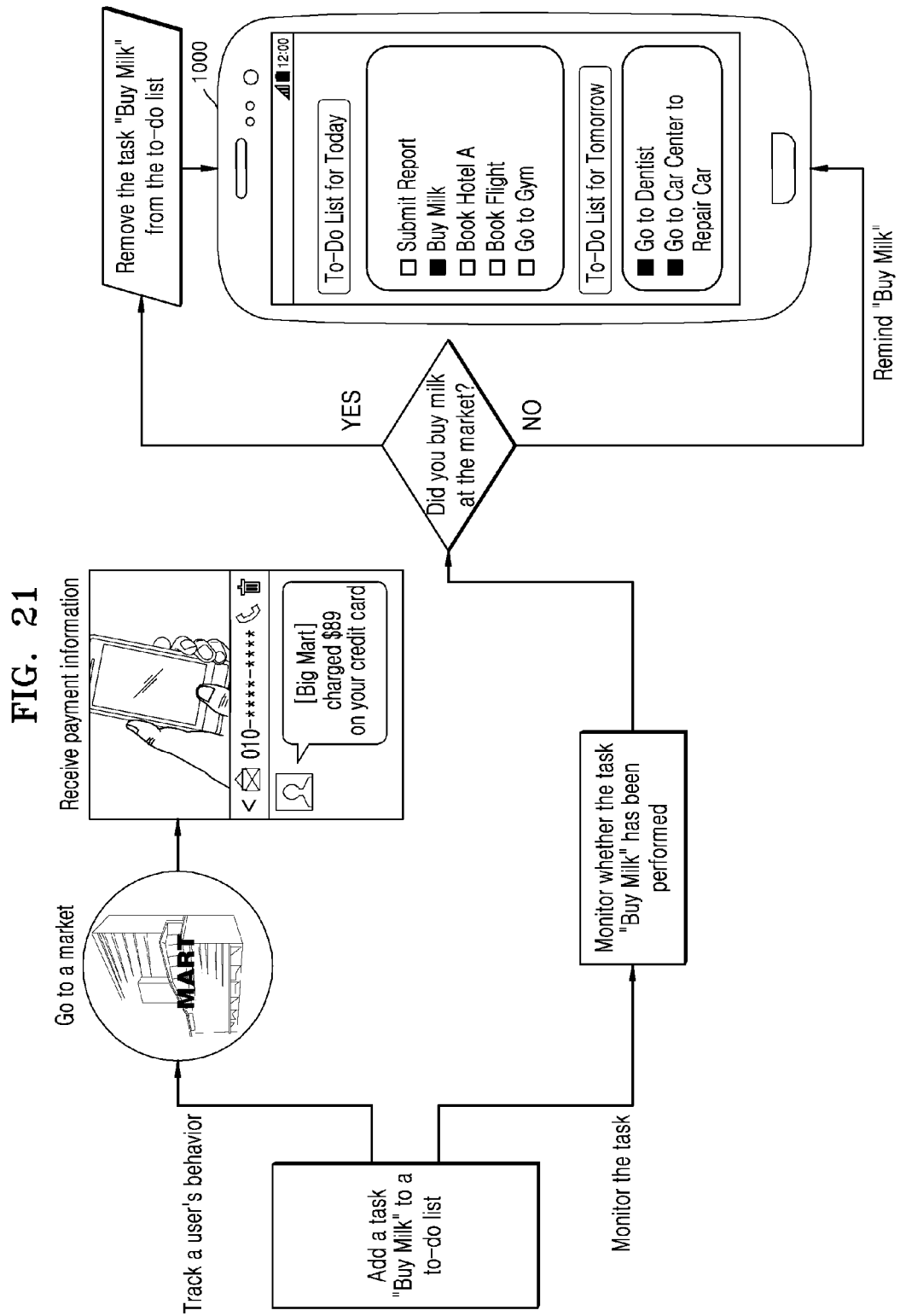
FIG. 21 is a view for explaining a process by which a device monitors whether a task in a to-do list has been performed, according to another embodiment.

FIG. 21 is a view for explaining a process by which the device 1000 monitors whether a task in a to-do list has been performed, according to another example embodiment.

Referring to FIG. 21, the device 1000 may add a task "Buy Milk" to a to-do list. The device 1000 may determine condition information used to determine whether the task "Buy Milk" has been performed. For example, the device 1000 may determine a case where text message information obtained from a message application includes "a payment for milk" as the condition information.

The device 1000 may monitor an operation of an application related to the user's behavior. The device 1000 may monitor in real time a payment history of the user related to the text message information obtained from the message application. When the device 1000 determines that the payment history of the user includes "a payment for milk", the device 1000 may determine that the task "Buy Milk" has been performed.

Also, the device 1000 may output notification information indicating whether the task "Buy Milk" has been performed. The device 1000 may receive information about whether the task "Buy Milk" has been performed from the user. The device 1000 may determine whether the task "Buy Milk" has been performed according to the information. When it is determined that the task "Buy Milk" has not been performed, the device 1000 may display a notification window showing "Buy Milk" on an execution screen of a display.

Figure 22:
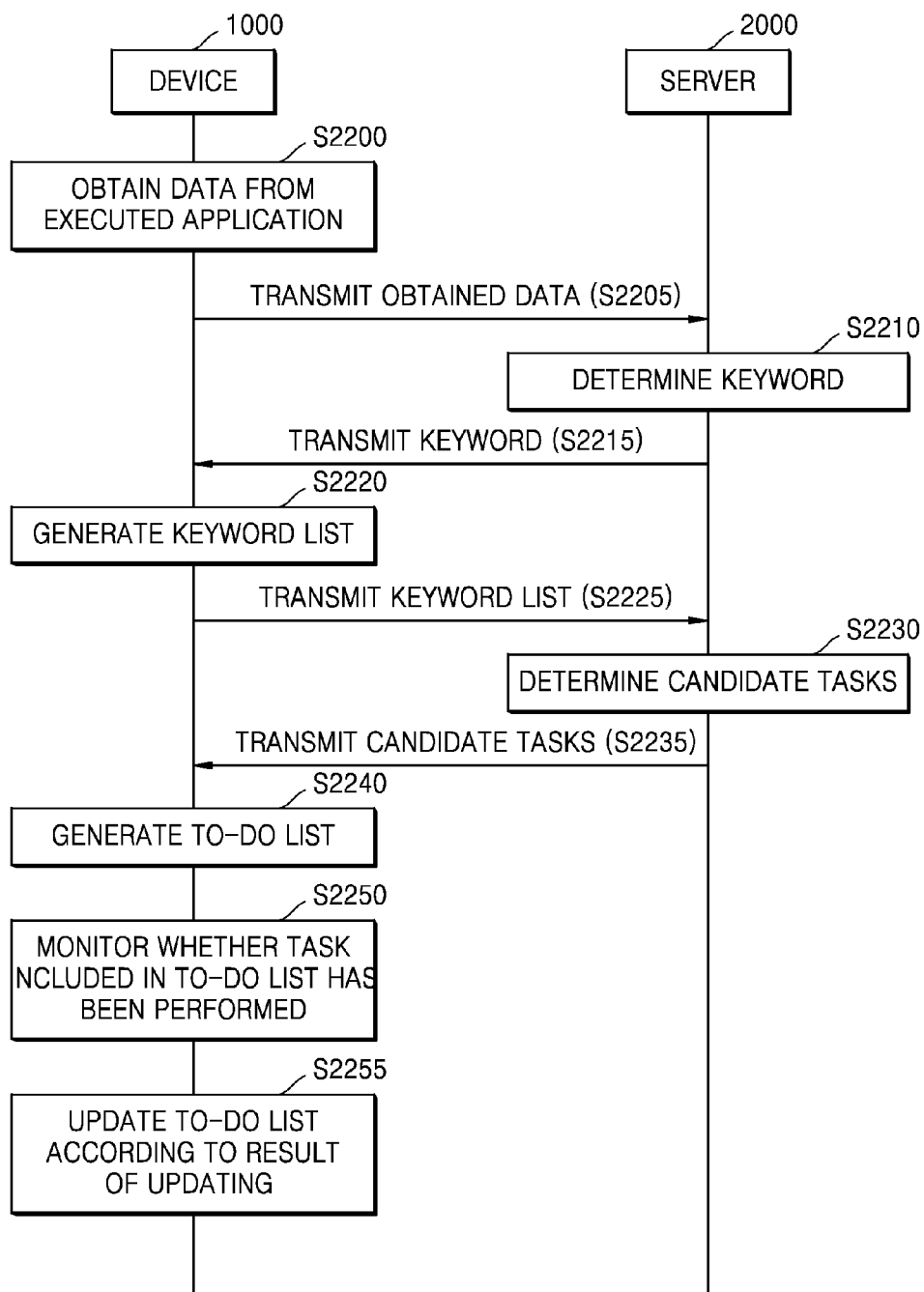
FIG. 22 is a flowchart of a method by which a server determines a candidate data, and a device generates a to-do list and monitors whether a task in the to-do list has been performed, according to an embodiment.

FIG. 22 is a flowchart of a method by which the server 2000 determines candidate tasks, and the device 1000 generates a to-do list and monitors whether a task in the to-do list has been performed, according to an example embodiment.

In operation S2200, the device 1000 may obtain data from an application executed on a display of the device 1000. Examples of the data may include, but are not limited to, data about content of a call through the device 1000, content of a message transmitted/received through the device 1000, content of an e-mail transmitted/received through the device 1000, content of a memo recorded on the device 1000, content of voice recorded on the device 1000, and content of a user schedule stored in the device 1000.

In operation S2205, the device 1000 may transmit the obtained data to the server 2000. The server 2000 may be a service providing server to which a user subscribes. The server 2000 may provide, but is not limited to, an SNS service, a message transmission/reception service, a communication service, a schedule management service, a content providing service, and a search service.

In operation S2210, the server 2000 may determine at least one keyword used to determine at least one task to be performed by the user based on the obtained data. For example, the server 2000 may receive data about content of a transmitted/received message, and may analyze the content of the message. The server 2000 may determine a keyword used to determine tasks based on a result of the analysis. Also, the server 2000 may determine at least one keyword used to determine at least one task to be performed by the user, based on the obtained data and data stored in the server 2000.

In operation S2215, the server 2000 may transmit the determined at least one keyword to the device 1000.

In operation S2220, the device 1000 may generate a keyword list of the at least one keyword. The device 1000 may display a GUI for selecting at least one from among the at least one keyword in the keyword list. The device 1000 may receive an input that modifies the keyword list through the GUI, and may generate a keyword list according to the input.

In operation S2225, the device 1000 may transmit the keyword list to the server 2000.

In operation S2230, the server 2000 may determine at least one candidate task based on the keyword list. The server 2000 may determine at least one candidate task based on a first keyword in the keyword list.

In operation S2235, the server 2000 may transmit the determined at least one candidate task to the device 1000.

In operation S2240, the device 1000 may generate a to-do list to be performed by the user, based on the at least one candidate task. The device 1000 may generate a candidate task list of the at least one candidate task, and may generate a to-do list including at least one main task and at least one sub-task subordinate to the at least one main task based on the candidate task list.

In operation S2250, the device 1000 may monitor whether at least one task in the to-do list has been performed. The device 1000 may obtain condition information used to determine whether the at least one task in the to-do list has been performed, and may monitor whether the at least one task in the to-do list has been performed based on the condition information.

In operation S2255, the device 1000 may update tasks in the to-do list according to a result of the monitoring. For example, the device 1000 may remove a task that has been performed from the to-do list. Also, the deice 1000 may provide notification information about a task that has not been performed.

Figure 23:
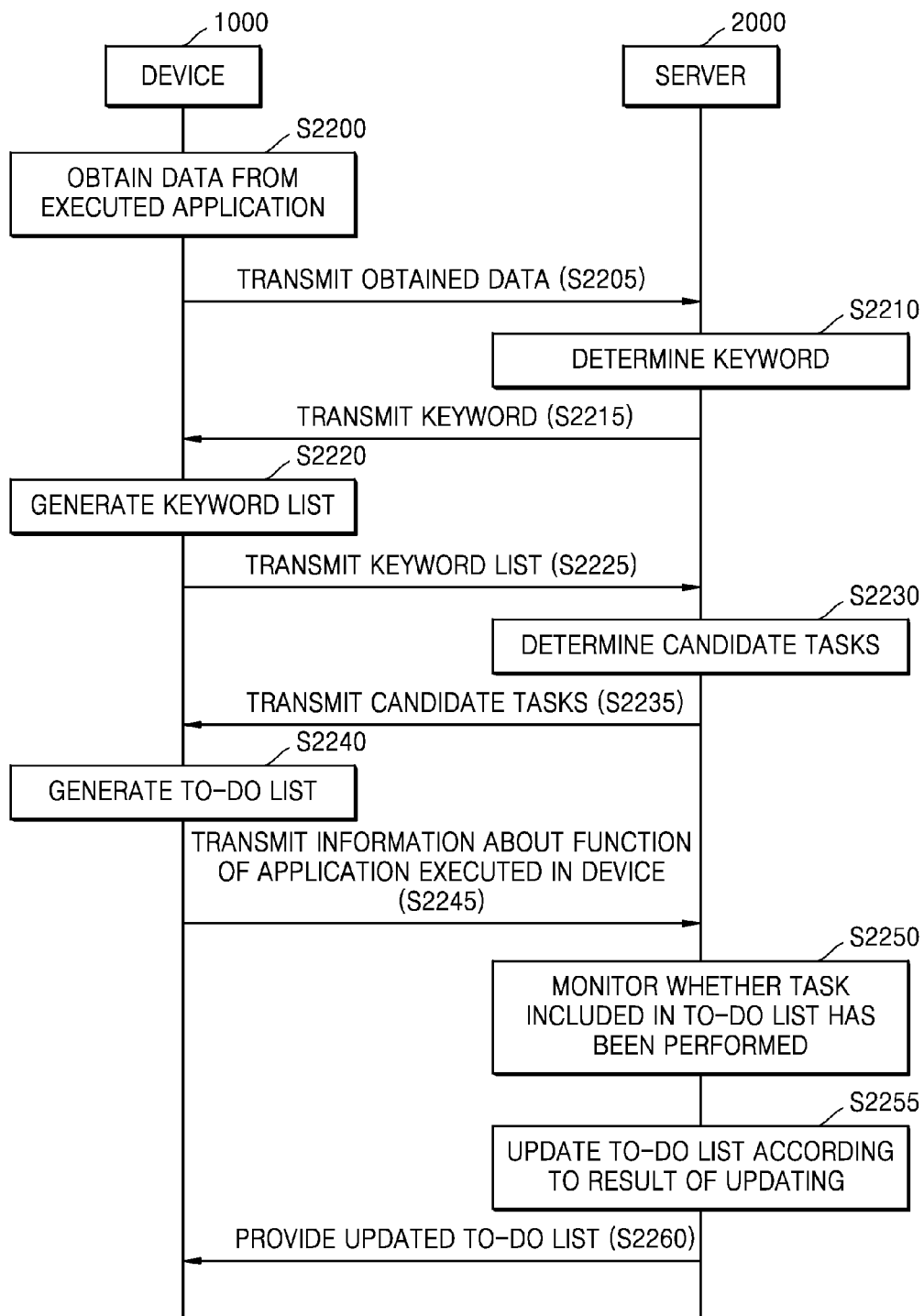
FIG. 23 is a flowchart of a method by which a device generates a to-do list, and a server determines candidate tasks for determining tasks in the to-do list and monitors whether a task in the to-do list has been performed, according to another embodiment.

FIG. 23 is a flowchart of a method by which the device 1000 generates a to-do list, and the server 2000 determines candidate tasks for determining tasks in the to-do list and monitors whether s task in the to-do list has been performed, according to another example embodiment.

Operations S2200, S2205, S2210, S2215, S2220, S2225, S2230, S2235, and S2240 performed by the device 100 and the server 2000 of FIG. 23 are the same as those performed by the device 1000 and the server 2000 of FIG. 22.

In operation S2245, the device 1000 may transmit information about a function of the application(s) executed in the device 1000 to the server 2000.

In operation S2250, the server 2000 may monitor whether at least one task in the to-do list has been performed. The device 1000 may obtain condition information used to determine the at least one task in the to-do list has been performed, and may monitor whether the at least one task in the to-do list has been performed based on the condition information.

In operation S2255, the server 2000 may update tasks in the to-do list according to a result of the monitoring. For example, the server 2000 may remove a task that has been performed from the to-do list.

In operation S2260, the server 2000 may provide the updated to-do list to the device 1000.

Figure 24:
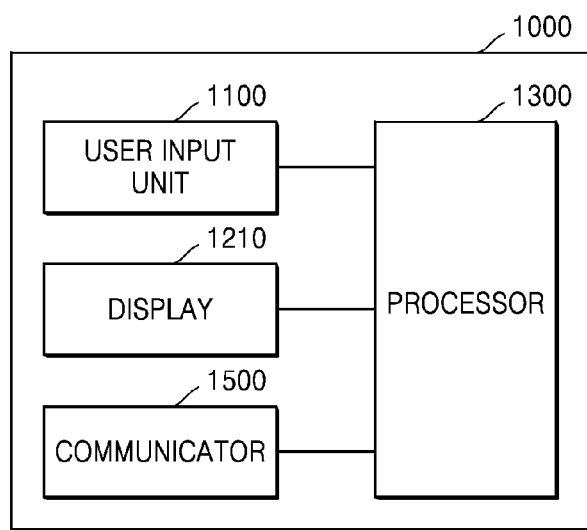
FIGS. 24 and 25 are block diagrams of a device according to an embodiment.
Figure 25:
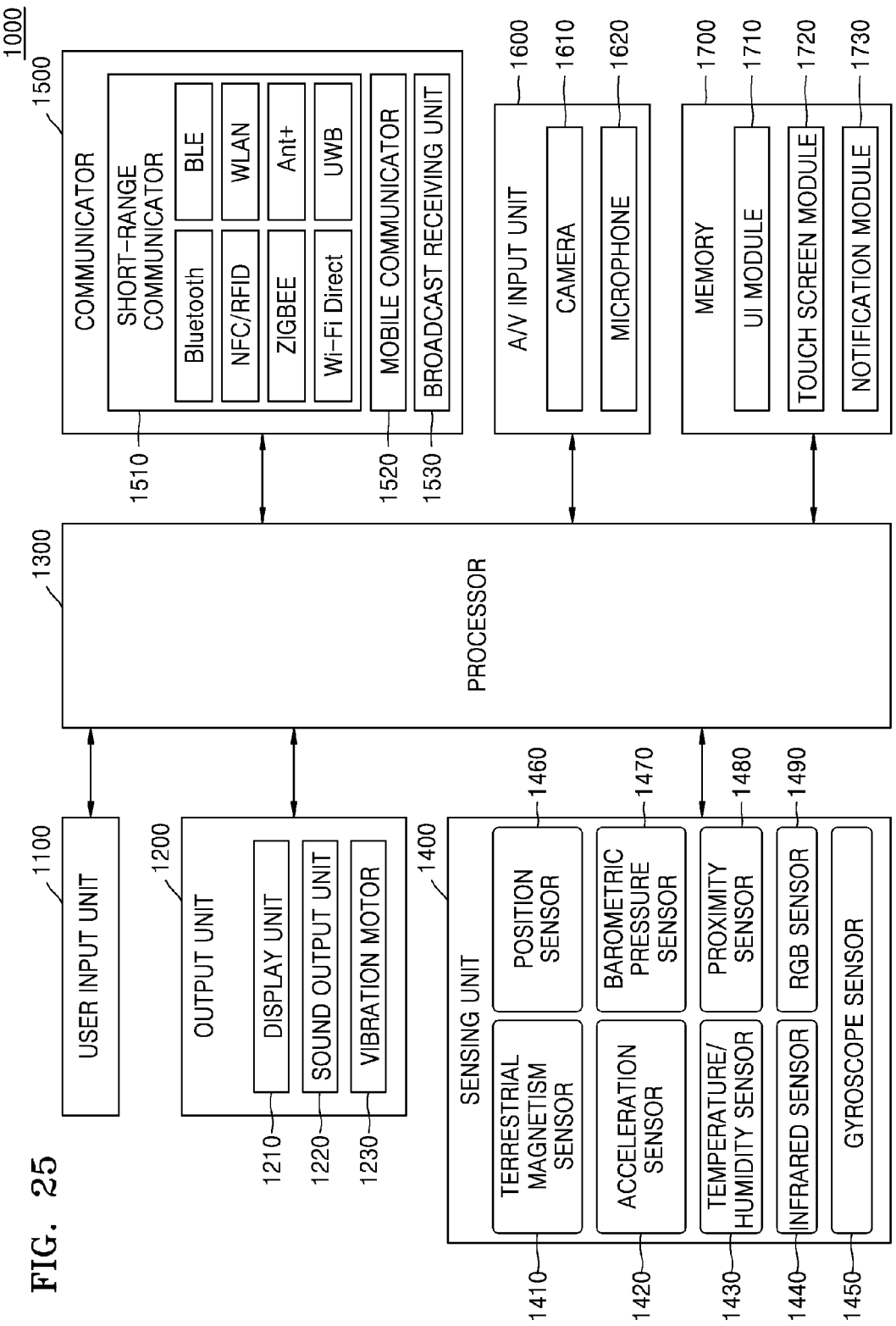

FIGS. 24 and 25 are block diagrams of the device 1000 according to some example embodiments.

As shown in FIG. 24, the device 1000 according to some embodiments may include a user input unit 1100 (including input interface circuitry), an output unit 1200 (including output interface circuitry), a processor 1300 which includes processing circuitry, and a communicator 1500 which includes communication circuitry. However, all elements of FIG. 24 are not essential elements of the device 1000. The device 1000 may include elements more or less than the elements illustrated in FIG. 24.

For example, as shown in FIG. 25, the device 1000 according to some embodiments may further include a sensing unit 1400 including sensing circuitry, an audio/video (A/V) input unit 1600, and a memory 1700 in addition to the user input unit 1100, the output unit 1200, the processor 1300, and the communicator 1500.

The user input unit 1100 is a unit through which a user inputs data for controlling the device 1000. Examples of the user input unit 1100 may include, but are not limited to, a keypad, a dome switch, a touchpad (e.g., a contact-type capacitance method, a pressure-type resistance film method, an infrared sensing method, a surface ultrasound transmission method, an integral tension measuring method, or a piezoelectric effect method), a jog wheel, and a jog switch.

The user input unit 1100 may request for a response message to a voice input of the user and may receive a user input for executing an operation related to the response message.

The output unit 1200 may output an audio signal, a video signal, or a vibration signal, and may include a display 1210, a sound output unit 1220, and a vibration motor 1230.

The display 1210 displays and outputs information processed by the device 1000. For example, the display 1210 may display a user interface for requesting for a response message to a voice input of the user and executing an operation related to the response message.

The sound output unit 1220 outputs audio data received from the communicator 1500 or stored in the memory 1700. Also, the sound output unit 1220 outputs a sound signal (e.g., a call signal receiving sound, a message receiving sound, or a notification sound) related to a function performed by the device 1000.

The processor 1300 typically controls an overall operation of the device 1000. For example, the processor 1300 may control the user input unit 1100, the output unit 1200, the sensing unit 1400, the communicator 1500, and the AN input unit 1600 by executing programs stored in the memory 1700. Also, the processor 1300 may perform a function of the device 1000 of FIGS. 1 through 24 by executing programs stored in the memory 1700.

In detail, the processor 1300 may determine at least one keyword used to determine at least one task to be performed by the user in a to-do list, based on data obtained by an application executed on the display 1210. The processor 1300 may generate a keyword list of the determined at least one keyword.

The processor 1300 may display a GUI for selecting at least one from among the at least one keyword in the keyword list by controlling the display 1210. The processor 1300 may display the GUI for selecting at least one from among the at least one keyword in the keyword, on an execution screen of the executed application by controlling the display 1210. For example, the application may be a chatting application for communication with an external device, and the at least one keyword may be extracted from text transmitted/received between the device 1000 and the external device.

The processor 1300 may receive an input that selects a first keyword related to a first item in the keyword list through the GUI. The processor 1300 may determine at least one candidate task for the first item based on the selected first keyword. The processor 1300 may display a candidate task list of the determined at least one candidate task by controlling the display 1210.

The processor 1300 may determine the at least one candidate task for the first item by combining all or some of the selected first keyword, data related to the first keyword obtained by at least one application installed in the device 1000, and data related to the first keyword obtained from a service providing server to which the user subscribes.

The processor 1300 may display a GUI for editing the candidate task list by controlling the display 1210. The processor 1300 may generate a to-do list including at least one main task and at least one sub-task subordinate to the at least one main task based on the candidate task list. The processor 1300 may determine at least one task in the to-do list based on the at least one keyword selected through the GUI.

The processor 1300 may determine at least one substitute task for changing at least one task in the to-do list, based on data obtained by at least one application different from the application executed on the display 1210 and data obtained from the service providing server to which the user subscribes. The processor 1300 may display the at least one substitute task by controlling the display 1210.

The processor 1300 may obtain condition information used to determine whether at least one task in the to-do list has been performed, and may monitor whether the at least one task in the to-do list has been performed based on the condition information. The processor 1300 may update tasks in the to-do list, based on a result of the monitoring.

Also, the processor 1300 may judge the user's intention, may provide relevant information, and may recommend a substitute operation, by using a data recognition model stored in the memory 1700 or the server 2000, which will be explained below in detail with reference to FIGS. 27 through 30.

The sensing unit 1400 may detect a state of the device 1000 or a state around the device 1000 and may transmit information about the state to the processor 1300.

The sensing unit 1400 may include at least one from among, but not limited to, a terrestrial magnetism sensor 1410, an acceleration sensor 1420, a temperature/humidity sensor 1430, an infrared sensor 1440, a gyroscope sensor 1450, a position sensor (e.g., a global positioning system (GPS)) 1460, a barometric pressure sensor 1470, a proximity sensor 1480, and an RGB sensor (e.g., an illuminance sensor) 1490. Functions of the sensors would have been intuitively derived by one of ordinary skill in the art from their names, and thus a detailed explanation thereof will not be given.

The communicator 1500 may include one or more elements through which the device 1000 communicates with another device (not shown) or the server 2000. The other device (not shown) may be, but is not limited to, a computing device or a sensing device like the device 1000. For example, the communicator 1500 may include a short-range communicator 1510, a mobile communicator 1520, and a broadcast receiving unit 1530.

Examples of the short-range communicator 1510 may include, but are not limited to, a Bluetooth communicator, a Bluetooth low energy (BLE) communicator, a near-field communicator, a WLAN (WiFi) communicator, a Zigbee communicator, an infrared data association (IrDA) communicator, a WiFi Direct (WFD) communicator, an ultra-wideband (UWB) communicator, and an Ant+ communicator.

The mobile communicator 1520 transmits/receives a wireless signal to/from at least one from among a base station, an external terminal, and a server via a mobile communication network. Examples of the wireless signal may include a voice call signal, a video call signal, and any of various pieces of data according to text/multimedia message transmission/reception.

The broadcast receiving unit 1530 receives a broadcast signal and/or broadcast-related information from the outside through a broadcast channel. Examples of the broadcast channel may include a satellite channel and a terrestrial channel. According to an example embodiment, the device 1000 may not include the broadcast receiving unit 1530.

Also, the communicator 1500 may transmit/receive information needed to request for a response message to a voice input of the user and execute an operation related to the response message to/from the other device (not shown) and the server 2000.

The A/V input unit 1600 for inputting an audio signal or a video signal may include a camera 1610 and a microphone 1620. The camera 1610 may obtain image frames such as a still image or a moving image by using an image sensor in a video mode or an imaging mode. An image captured by the image sensor may be processed by the processor 1300 or an additional image processor (not shown). An image captured by the camera 1610 may be used as context information of the user.

The microphone 1620 receives an external sound signal and processes the external sound signal into electrical voice data. For example, the microphone 1620 may receive a sound signal from an external device or a speaker. The microphone 1620 may receive a voice input of the user. The microphone 1620 may use any of various noise removing algorithms to remove noise occurring when receiving the external sound signal.

The memory 1700 may store a program for processing and controlling the processor 1300, and may store data input to the device 1000 or output from the device 1000.

The memory 1700 may include at least one type of storage medium from among a flash memory type, a hard disk type, a multimedia card micro type, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

Programs stored in the memory 1700 may be classified into a plurality of modules according to functions of the memory 1700. For example, the memory 1700 may include a user interface (UI) module 1710, a touchscreen module 1720, and a notification module 1730.

The UI module 1710 may provide a specialized UI or a GUI that interoperates with the device 1000 according to an application. The touchscreen module 1720 may detect a touch gesture on a touchscreen of the user, and may transmit information about the touch gesture to the processor 1300. The touchscreen module 1720 according to some embodiments may recognize and analyze a touch code. The touchscreen module 1720 may be configured as separate hardware including a controller.

The notification module 1730 may generate a signal for notifying an event occurring in the device 1000. Examples of the event occurring in the device 1000 may include call signal reception, message reception, key signal input, and schedule notification. The notification module 1730 may output a notification signal as a video signal through the display 1210, may output a notification signal as an audio signal through the sound output unit 1220, or may output a notification signal as a vibration signal through the vibration motor 1230.

Figure 26:
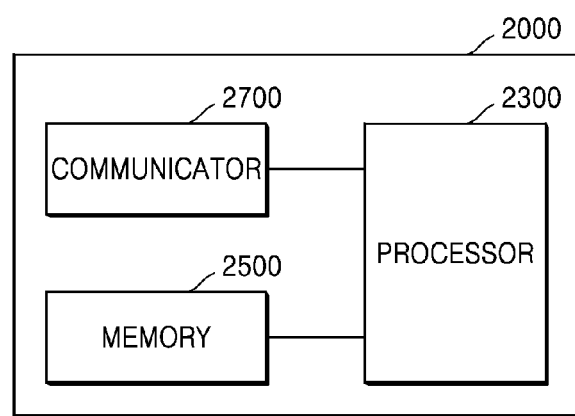
FIG. 26 is a block diagram of a server according to an embodiment.

FIG. 26 is a block diagram of the server 2000 according to some embodiments.

Referring to FIG. 26, the server 2000 according to some embodiments may include a memory 2500, a communicator 2700 and a processor 2300.

The memory 2500 may store data obtained by an application executed or installed in a device of a user from the device of the user. Also, the memory 2500 may store data related to a service to which the user of the device subscribes.

The communicator 2700 may receive the data obtained by the application executed or installed in the device of the user from the device of the user.

The processor 2300, including processing circuitry, may determine at least one keyword used to determine at least one task to be performed by the user in a to-do list based on the data obtained from the device. The processor 2300 may determine the at least one keyword by combining all or some of the data obtained from the device and data stored in the server 2000. Also, the processor 2300 may determine at least one candidate task related to the at least one keyword based on the data obtained from the device and the data related to the service to which the user subscribes.

Also, the processor 2300 may monitor whether at least one task in the to-do list has been performed, based on condition information for determining whether a task in the to-do list has been performed. The processor 2300 may update the to-do list of the user based on a result of the monitoring.

Also, the communicator 2700 may transmit at least one keyword used to determine tasks in the to-do list of the user, a keyword list of the at least one keyword, at least one candidate task related to the at least one keyword, a list of the at least one candidate task, and an updated to-do list to the device.

The processor 2300 typically controls an overall operation of the server 2000. For example, the processor 2300 may control operations of the memory 2500 and the communicator 2700 by executing programs stored in the memory 2500 of the server 2000. The processor 2300 may perform some of operations of the device 1000 of FIGS. 1 through 24 by executing programs stored in the memory 2500.

Figure 27:
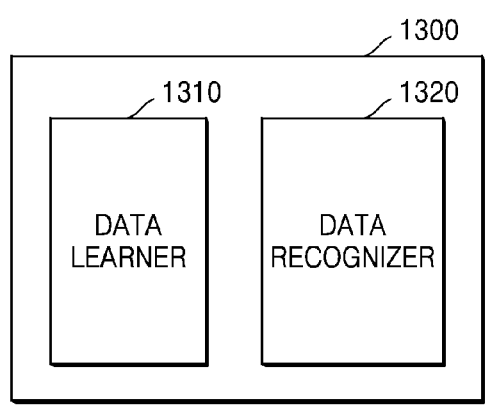
FIG. 27 is a block diagram of a processor according to an embodiment.

FIG. 27 is a block diagram of the processor 1300 according to an example embodiment.

Referring to FIG. 27, the processor 1300, including processing circuitry, according to some embodiments may include a data learner 1310 and a data recognizer 1320.

The data learner 1310 may collect data used to determine tasks in a to-do list of a user from a plurality of applications installed in the device 1000 and from the server 2000. The data learner 1310 may obtain data to be used for learning to determine tasks in the to-do list of the user from a call application for transmitting/receiving a voice signal between the user's device and another user's device, a message application for communication between the user's device and the other user's device, an e-mail application of the user, a notepad application for recording a memo of the user, and a schedule management application for managing a schedule of the user. The data learner 1310 may train a data recognition model to analyze the collected data and have a standard for determining a keyword used to determine tasks in the to-do list of the user.

Also, the data learner 1310 may train the data recognition model to judge the user's intention by analyzing the collected data and have a standard for providing tasks suitable for the user's intention. Also, the data learner 1310 may train the data recognition model to have a standard for determining a substitute task that may replace a task that is previously determined.

Also, the data learner 1310 may train the data recognition model to have a standard for determining whether at least one task in the to-do list has been performed. The data learner 1310 may determine an application used to perform a predetermined task, operation information of the user related to the application, and a relationship between detailed operations of the application according to the operation information of the user, and may train the data recognition model to have a standard for determining whether at least one task in the to-do list has been performed based on the determined relationship.

The data learner 1310 may train the data recognition model to have a standard about which data is to be used to determine tasks in the to-do list of the user by using the obtained data and about how to judge a situation by using the data. The data learner 1310 may obtain data to be used for learning, and may train the data recognition model to have a standard for judging a situation by applying the obtained data to the data recognition model.

The data recognizer 1320 may judge a situation based on data. The data recognizer 1320 may recognize a situation from predetermined data by using the trained data recognition model. The data recognizer 1320 may obtain predetermined data according to a preset standard by learning, and may judge a predetermined situation based on the predetermined data by using the data recognition model by using the obtained data as an input value. Also, a resultant value output from the data recognition model when the obtained data is used as an input value may be used to update the data recognition model.

At least one of the data learner 1310 and the data recognizer 1320 may be manufactured as at least one hardware chip and may be mounted on an electronic apparatus. For example, at least one of the data learner 1310 and the data recognizer 1320 may be manufactured as a dedicated hardware chip for artificial intelligence (AI), or may be manufactured as a part of an existing general-purpose processor (e.g., a central processing unit (CPU) or an application processor) or a graphics processor (e.g., a graphics processing unit (GPU)) and may be mounted on any of various electronic apparatuses.

In this case, the data learner 1310 and the data recognizer 1320 may be mounted on one electronic apparatus, or may be separately respectively mounted on electronic apparatuses. For example, one of the data learner 1310 and the data recognizer 1320 may be included in an electronic apparatus, and the remaining one may be included in a server. Also, model information established by the data learner 1310 may be provided to the data recognizer 1320 and data input to the data recognizer 1320 may be provided as additional learning data to the data learner 1310 by wire or wirelessly.

At least one of the data learner 1310 and the data recognizer 1320 may be implemented as a software module. When at least one of the data learner 1310 and the data recognizer 1320 is implemented as a software module (or a program module including instructions), the software module may be stored in a non-transitory computer-readable recording medium. Also, in this case, at least one software module may be provided by an operating system (OS), or may be provided by a predetermined application. Alternatively, a part of at least one software module may be provided by an OS, and the remaining part may be provided by a predetermined application.

Figure 28:
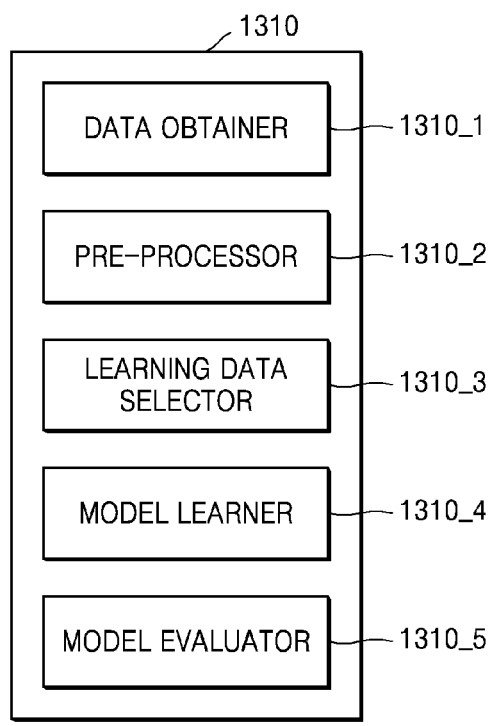
FIG. 28 is a block diagram of a data learner according to an embodiment.

FIG. 28 is a block diagram of the data learner 1310 according to an example embodiment.

Referring to FIG. 28, the data learner 1310 according to some embodiments may include a data obtainer 1310_1, a pre-processor 1310_2, a learning data selector 1310_3, a model learner 1310_4, and a model evaluator 1310_5.

However, embodiments are not limited thereto, and the data learner 1310 may include only some of the above elements or may further include elements in addition to the above elements.

The data obtainer 1310_1 may obtain data needed to judge a situation. The data obtainer 1310_1 may obtain data needed for learning to judge a situation.

The data obtainer 1310_1 may obtain data about call voice between a user and another user from a call application in the device 1000. When the call application is executed and a call is made between the user and the other user, the data obtainer 1310_1 may record call voice. The data obtainer 1310_1 may convert the recorded call voice into text and may obtain the text. Also, the data obtainer 1310_1 may transmit the recorded call voice to the server 2000, and may receive text converted from the call voice from the server 2000.

Also, the data obtainer 1310_1 may obtain a message transmitted/received between the user and the other user from a message application. When the device 1000 executes the message application in the device 1000 and transmits/receives a message to/from the other user, the data obtainer 1310_1 may obtain the transmitted/received message. Examples of the message application may include, but are not limited to, a chatting application, an SMS/MMS sending/receiving application, a messenger application, and an SNS application. Also, the data obtainer 1310_1 may obtain text of an e-mail transmitted/received to/from the device 1000. In this case, the data obtainer 1310_1 may obtain text of an e-mail from an e-mail sending/receiving application or a web browser executed in the device 1000.

Also, the data obtainer 1310_1 may obtain data about a schedule of the user through a schedule management application of the user installed in the device 1000. Also, the user may record schedule information of the user on a service providing server by using a service of the service providing server, and the data obtainer 1310_1 may receive the schedule information of the user stored in the service providing server from the service providing server. In this case, the data obtainer 1310_1 may receive the schedule information of the user from the service providing server by using a user ID of the service providing server. Also, the user may input the schedule information of the user to another device 1000 of the user, and the data obtainer 1310_1 may obtain memo information of the user from the other device 1000 of the user.

Also, the data obtainer 1310_1 may collect log information of an application executed in the device 1000. The log information may indicate which operation has been performed by the application executed in the device 1000 based on a user input. The data obtainer 1310_1 may collect pieces of log information about a detailed operation of the executed application, and may obtain data used to determine whether a task of the user has been performed.

The data obtainer 1310_1 may receive a video. The video may include a plurality of images (or frames). For example, the data obtainer 1310_1 may receive a video through a camera of an electronic apparatus including the data learner 1310 or an external camera (e.g., a closed circuit television (CCTV) or a black box) that may communicate with the electronic apparatus including the data learner 1310. The camera may include one or more image sensors (e.g., a front sensor or a rear sensor), a lens, an image signal processor (ISP), or a flash (e.g., a light-emitting diode (LED) or a xenon lamp).

For example, the data obtainer 1310_1 may obtain voice data, image data, text data, or bio-signal data. For example, the data obtainer 1310_1 may receive data through an input device (e.g., a microphone, a camera, or a sensor) of the electronic apparatus. Alternatively, the data obtainer 1310_1 may obtain data through an external device that communicates with the electronic apparatus.

The pre-processor 1310_2 may pre-process the obtained data so that the obtained data is used for learning for a standard for determining a keyword used to determine tasks in a to-do list of the user, a standard for providing tasks suitable for the user's intention, a standard for determining a substitute task that may replace a task that is previously determined, and a standard for determining whether at least one task in the to-do list has been performed. The pre-processor 1310_2 may process the obtained data into a preset format so that the model learner 1310_4 uses the obtained data for learning to determine tasks in the to-do list.

The learning data selector 1310_3 may select data needed for learning from among pieces of the pre-processed data. The selected data may be provided to the model learner 1310_4. The learning data selector 1310_3 may select data needed for learning from among the pieces of pre-processed data, according to a preset standard for determining a keyword used to determine tasks in the to-do list of the user, judging the user's intention, recommending a substitute task to an existing task, and monitoring whether a task has been performed. Also, the learning data selector 1310_3 may select data according to a standard preset by learning by the model learner 1310_4.

The model learner 1310_4 may train a data recognition model to have a standard about how to judge the user's intention and how to determine candidate tasks, how to determine a substitute task to an existing task, and how to perform monitoring for determining whether a task has been performed, from data collected based on learning data. Also, the model learner 1310_4 may train the data recognition model to have a selection standard about which learning data is to be used to judge the user's intention, determine candidate tasks, determine a substitute task, and judge monitoring of a task.

Also, the model learner 1310_4 may train the data recognition model used to judge a situation by using learning data. In this case, the data recognition model may be a previously established model. For example, the data recognition model may be a model that is previously established by receiving basic learning data (e.g., a sample image).

According to an example embodiment, the model learner 1310_4 may train the data recognition model to estimate a relationship between data obtained by the data recognition model and the other party by using message data, voice dialog data, and log data obtained by the data obtainer 1310_1 and at least one information related to the other party included in a contacts application as learning data. In this case, the data recognition model may be, for example, a relationship model.

For example, the model learner 1310_4 may learn a relationship between a position in content of a dialog and a position included in the other party information by using the content of the dialog and the other party information included in the contacts application as learning data.

According to an example embodiment, the model learner 1310_4 may train the data recognition model to estimate a keyword from data by using at least one sentence, an interrogative word (e.g., who, when, where, what, how, or why), and a word corresponding to the interrogative word in the sentence as learning data. In this case, the data recognition model may include a natural language generation (NLG) learning model.

According to an example embodiment, the model learner 1310_4 may train the data recognition model to estimate tasks (or candidate tasks) from a keyword by using a template (e.g., a sentence) or a document corresponding to an item (e.g., a work, a routine (e.g., shopping, child caring, or eating), or a travel), a word, and a template or a document to which the word is applied as learning data. In this case, the data recognition model may include a natural language processing (NLP).

According to an example embodiment, the model learner 1310_4 may train the data recognition model to estimate whether a task has been performed by using log data of the device 1000 and the task as learning data.

According to various embodiments, the data recognition models may be implemented as one data recognition model, or may be implemented as individual data recognition models.

The data recognition model may be established in consideration of a field to which a recognition model is applied, the purpose of learning, or the computer performance of the device 1000. The data recognition model may be a model based on, for example, a neural network. For example, a model such as a deep neural network (DNN), a recurrent neural network (RNN), or a bidirectional recurrent deep neural network (BRDNN) may be used as the data recognition model.

According to various embodiments, when a plurality of data recognition models that are previously established exist, the model learner 1310_4 may determine a data recognition model having a high relationship with input learning data and basic learning data as a data recognition model to be trained. In this case, the basic learning data may be previously classified according to types of data, and the data recognition models may be previously established according to the types of data. For example, the basic learning data may be previously classified according to various standards such as an area where learning data is generated, a time for which the learning data is generated, a size of the learning data, a genre of the learning data, a generator of the learning data, and a type of an object in the learning data.

Also, the model learner 1310_4 may train the data recognition model by using a learning algorithm including, for example, error back-propagation or gradient descent.

Also, the model learner 1310_4 may train the data recognition model through supervised learning by using, for example, learning data as an input value. Also, the model learner 1310_4 may train the data recognition model through unsupervised learning to find a standard for judging the user's intention, determining candidate tasks, determining a substitute task, and judging monitoring of a task by learning a type of data needed to judge a situation by itself without supervision. Also, the model learner 1310_4 may train the data recognition model through reinforcement learning using a feedback about whether a result of judging the user's intention, determining candidate tasks, determining a substitute task, and judging monitoring of a task according to learning is right.

Also, when the data recognition model is trained, the model learner 1310_4 may store the trained data recognition model. In this case, the model learner 1310_4 may store the trained data recognition model in a memory of an electronic apparatus including the data recognizer 1320. Alternatively, the model learner 1310_4 may store the trained data recognition model in a memory of a server connected to the electronic apparatus by wire or wirelessly.

In this case, the memory in which the trained data recognition model is stored may also store a command or data related to at least another element of the electronic apparatus. Also, the memory may store software and/or a program. The program may include, for example, a kernel, middleware, an application programming interface (API), and/or an application program (or an "application").

When evaluation data is input to the data recognition model and a recognition result output from the evaluation data does not satisfy a predetermined standard, the model evaluator 1310_5 may cause the model learner 1310_4 to be trained again. In this case, the evaluation data may be preset data for evaluating the data recognition model.

For example, from among recognition results of the trained data recognition model output from evaluation data, when the number or a ratio of recognition results that are not accurate exceeds a preset threshold value, it may be evaluated that the predetermined standard is not satisfied. For example, when 2% is defined as the predetermined standard and wrong recognition results are output from more than 20 pieces of evaluation data from among 1000 pieces of evaluation data, the model evaluator 1310_5 may evaluate that the trained data recognition model is not suitable.

When a plurality of trained data recognition models exist, the model evaluator 1310_5 may evaluate whether each of the trained recognition models satisfies a predetermined standard, and may determine a model satisfying the predetermined standard as a final data recognition model. In this case, when a plurality of models satisfy the predetermined standard, the model evaluator 1310_5 may determine one or a predetermined number of models that are preset in a descending order of evaluation scores as final data recognition models.

At least one of the data obtainer 1310_1, the pre-processor 1310_2, the learning data selector 1310_3, the model learner 1310_4, and the model evaluator 1310_5 in the data learner 1310 may be manufactured as at least one hardware chip and may be mounted on an electronic apparatus. For example, at least one of the data obtainer 1310_1, the pre-processor 1310_2, the learning data selector 1310_3, the model learner 1310_4, and the model evaluator 1310_5 may be manufactured as a dedicated hardware chip for AI, or may be manufactured as a part of an existing general-purpose processor (e.g., a CPU or an application processor) or a graphics processor (e.g., a GPU) and may be mounted on any of various electronic apparatuses.

Also, the data obtainer 1310_1, the pre-processor 1310_2, the learning data selector 1310_3, the model learner 1310_4, and the model evaluator 1310_5 may be mounted on one electronic apparatus, or may be separately respectively mounted on electronic apparatuses. For example, some of the data obtainer 1310_1, the pre-processor 1310_2, the learning data selector 1310_3, the model learner 1310_4, and the model evaluator 1310_5 may be included in an electronic apparatus, and the remaining others may be included in a server.

At least one of the data obtainer 1310_1, the pre-processor 1310_2, the learning data selector 1310_3, the model learner 1310_4, and the model evaluator 1310_5 may be implemented as a software module. When at least one of the data obtainer 1310_1, the pre-processor 1310_2, the learning data selector 1310_3, the model learner 1310_4, and the model evaluator 1310_5 is implemented as a software module (or a program module including instructions), the software module may be stored in a non-transitory computer-readable recording medium. Also, in this case, at least one software module may be provided by an OS, or may be provided by a predetermined application. Alternatively, a part of at least one software module may be provided by an OS, and the remaining part may be provided by a predetermined application.

Figure 29:
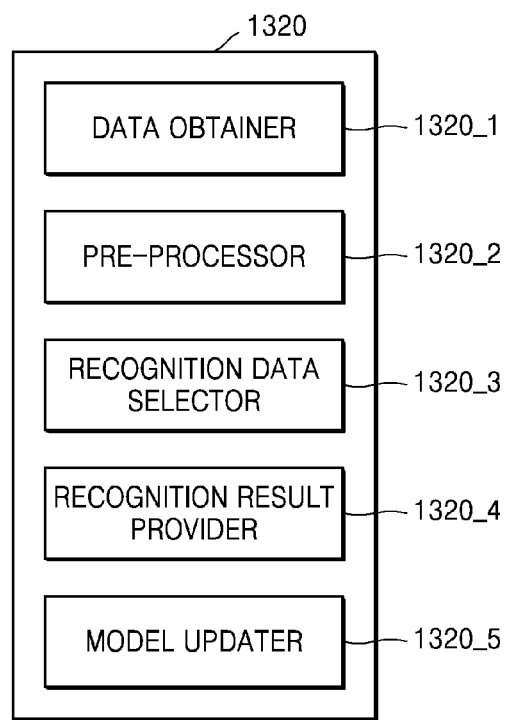
FIG. 29 is a block diagram of a data recognizer according to an embodiment.

FIG. 29 is a block diagram of the data recognizer 1320 according to an embodiment.

Referring to FIG. 29, the data recognizer 1320 according to some embodiments may include a data obtainer 1320_1, a pre-processor 1320_2, a recognition data selector 1320_3, a recognition result provider 1320_4, and a model updater 1320_5.

However, embodiments are not limited thereto, and the data recognizer 1320 may include only some of the above elements or may further include elements in addition to the above elements.

The data obtainer 1320_1 may obtain recognition data needed to judge a user's intention, determine candidate tasks, determine a substitute task, and judge monitoring of a task, and the pre-processor 1320_2 may pre-process obtained data so that the recognition data obtained to judge the user's intention, determine the candidate tasks, determine the substitute task, and to judge monitoring of the task is used.

According to an example embodiment, the data obtainer 1320_1 may obtain data in a manner similar to that used by the data obtainer 1310_1 of the data learner 1310 of FIG. 28.

For example, the data obtainer 1320_1 may obtain content of a dialog between a user and another user from a call application. Also, the data obtainer 1320_1 may obtain content of a message transmitted/received between the user and the other user from a message application. Also, the data obtainer 1320_1 may obtain data about a schedule of the user through a schedule management application of the user.

The pre-processor 1320_2 may process obtained recognition data into a preset format so that the recognition result provider 1320_4 uses the recognition data obtained to judge the user's intention, determine the candidate tasks, determine the substitute task, and judge monitoring of the task.

The recognition data selector 1320_3 may select recognition data needed to judge the user's intention, determine the candidate tasks, determine the substitute task, and judge monitoring of the task from among pieces of pre-processed data. The selected recognition data may be provided to the recognition result provider 1320_4. The recognition data selector 1320_3 may select some or all of the pieces of pre-processed recognition data according to a preset standard for judging the user's intention, determining the candidate tasks, determining the substitute task, and judging monitoring of the task. Also, the recognition data selector 1320_3 may select recognition data according to a standard preset by learning by the model learner 1310_4 as described below.

The recognition result provider 1320_4 may judge the user's intention, determine the candidate tasks, determine the substitute task, and judge monitoring of the task by applying the selected recognition data to a data recognition model. The recognition result provider 1320_4 may provide a recognition result according to recognition purpose of the recognition data. The recognition result provider 1320_4 may apply the selected recognition data to the data recognition model by using the recognition data selected by the recognition data selector 1320_3 as an input value. Also, the recognition result may be determined by the data recognition model.

According to an example embodiment, the recognition result provider 1320_4 may apply content of a text message as recognition data to the data recognition model. The data recognition model may estimate words corresponding to interrogative words in the text message as keywords. Also, the recognition result provider 1320_4 may apply content of a dialog as recognition data to the data recognition model. The data recognition model may estimate words corresponding to interrogative words in the content of the dialog as keywords.

According to an example embodiment, the recognition result provider 1320_4 may apply the estimated keywords as recognition data to the data recognition model. The data recognition model may estimate tasks provided as sentences (or candidate tasks) by applying the keywords to a template matched to at least one item.

According to an example embodiment, the recognition result provider 1320_4 may apply log data of the device 1000 as recognition data to the data recognition model. The data recognition model may check whether a task has been performed by using the log data.

The model updater 1320_5 may update the data recognition model, based on evaluation of a recognition result provided by the recognition result provider 1320_4. For example, the model updater 1320_5 may provide the recognition result provided by the recognition result provider

1320_4 to the model learner 1310_4 so that the model learner 1310_4 updates the data recognition model.

At least one of the data obtainer 1320_1, the pre-processor 1320_2, the recognition data selector 1320_3, the recognition result provider 1320_4, and the model updater 1320_5 may be manufactured as at least one hardware chip and may be mounted on an electronic apparatus. For example, at least one of the data obtainer 1320_1, the pre-processor 1320_2, the recognition data selector 1320_3, the recognition result provider 1320_4, and the model updater 1320_5 may be manufactured as a dedicated hardware chip for AI, or may be manufactured as a part of an existing general-purpose processor (e.g., a CPU or an application processor) or a graphics processor (e.g., a GPU) and may be mounted on any of various electronic apparatuses.

Also, the data obtainer 1320_1, the pre-processor 1320_2, the recognition data selector 1320_3, the recognition result provider 1320_4, and the model updater 1320_5 may be mounted on one electronic apparatus, or may be separately respectively mounted on electronic apparatuses. For example, some of at least one of the data obtainer 1320_1, the pre-processor 1320_2, the recognition data selector 1320_3, the recognition result provider 1320_4, and the model updater 1320_5 may be included in an electronic apparatus, and the remaining others may be included in a server.

Also, at least one of the data obtainer 1320_1, the pre-processor 1320_2, the recognition data selector 1320_3, the recognition result provider 1320_4, and the model updater 1320_5 may be implemented as a software module. When at least one of the data obtainer 1320_1, the pre-processor 1320_2, the recognition data selector 1320_3, the recognition result provider 1320_4, and the model updater 1320_5 is implemented as a software module (or a program module including instructions), the software module may be stored in a non-transitory computer-readable recording medium. Also, in this case, at least one software module may be provided by an OS, or may be provided by a predetermined application. Alternatively, a part of at least one software module may be provided by an OS, and the remaining part may be provided by a predetermined application.

Figure 30:
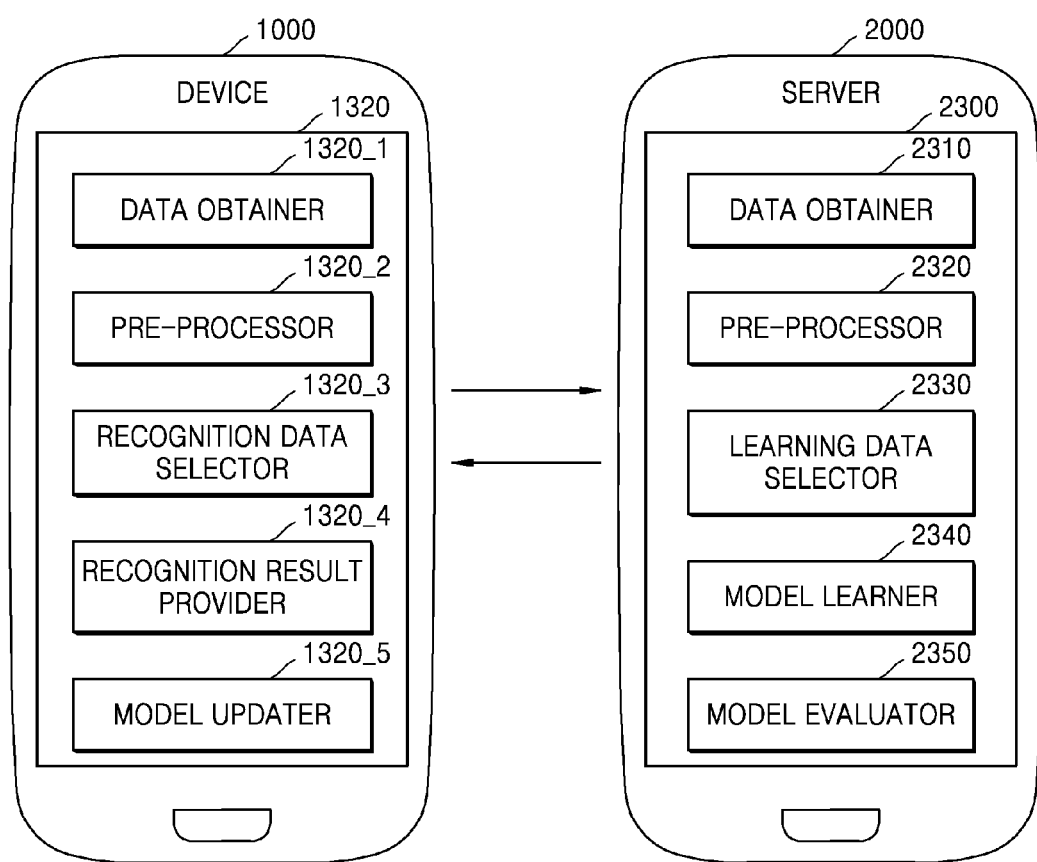
FIG. 30 is a view illustrating an example where a device and a server interoperate to learn and recognize data according to an embodiment.

FIG. 30 is a view illustrating an example where the device 1000 and the server 2000 interoperate to learn and recognize data according to an example embodiment.

Referring to FIG. 30, the server 2000 may train a data recognition model to have a standard for judging a user's intention, determining candidate tasks, determining a substitute task, and judging monitoring of a task, and the device 1000 may judge a situation based on a learning result of the server 2000.

In this case, a model learner 2340 of the server 2000 may perform a function of the data learner 1310 of FIG. 28. The model learner 2340 of the server 2000 may train the data recognition model to have a standard about which data is to be used in order to judge the user's intention, determine the candidate tasks, determine the substitute task, and judge monitoring of the task and about how to judge a situation by using the data. The model learner 2340 may obtain data to be used for learning, and may learn a selection standard for judging a situation by applying the obtained data to the data recognition model.

For example, the model learner 2340 may train the data recognition model to analyze collected data and have a standard for determining a keyword used to determine tasks in a to-do list of the user. Also, the model learner 2340 may train the data recognition model to judge the user's intention by analyzing the collected data and have a standard for providing tasks suitable for the user's intention. Also, the data learner 2340 may train the data recognition model to have a standard for determining a substitute task that may replace a task that is previously determined. Also, the data learner 2340 may train the data recognition model to have a standard for determining whether at least one task in the to-do list has been performed. The data learner 2340 may determine an application used to perform a predetermined task, operation information of the user related to the application, and a relationship between detailed operations of the application according to the operation information of the user, and may train the data recognition model to have a standard for determining whether at least one task in the to-do list has been performed based on the determined relationship.

Also, the recognition result provider 1320_4 of the device 1000 may judge the user's intention, determine the candidate tasks, determine the substitute task, and monitor the task by applying data selected by the recognition data selector 1320_3 to the data recognition model generated by the server 200. For example, the recognition result provider 1320_4 may transmit the data selected by the recognition data selector 1320_3 to the server 2000, and the server 2000 may request to judge the user's intention, determine the candidate tasks, determine the substitute task, and monitor the task by applying the data selected by the recognition data selector 1320_3 to the recognition model. Also, the recognition result provider 1320_4 may receive information about the user's intention, the candidate tasks, the substitute task, and a monitoring result of the task determined by the server 2000 from the server 2000.

Alternatively, the recognition result provider 1320_4 of the device 1000 may receive the data recognition model generated by the server 2000 from the server 2000 and may judge the user's intention, determine candidate tasks, determine a substitute task, and monitor a task by using the received data recognition model. In this case, the recognition result provider 1320_4 of the device 1000 may judge the user's intention, determine the candidate tasks, determine the substitute task, and monitor the task by applying data selected by the recognition data selector 1320_3 to the data recognition model received from the server 2000.

Also, the device 1000 and the server 2000 may effectively perform works for learning and data recognition of the data recognition model through division of roles. Accordingly, data processing may be efficiently performed to provide a service suitable for the user's intention and the privacy of the user may be effectively protected.

Figure 31:
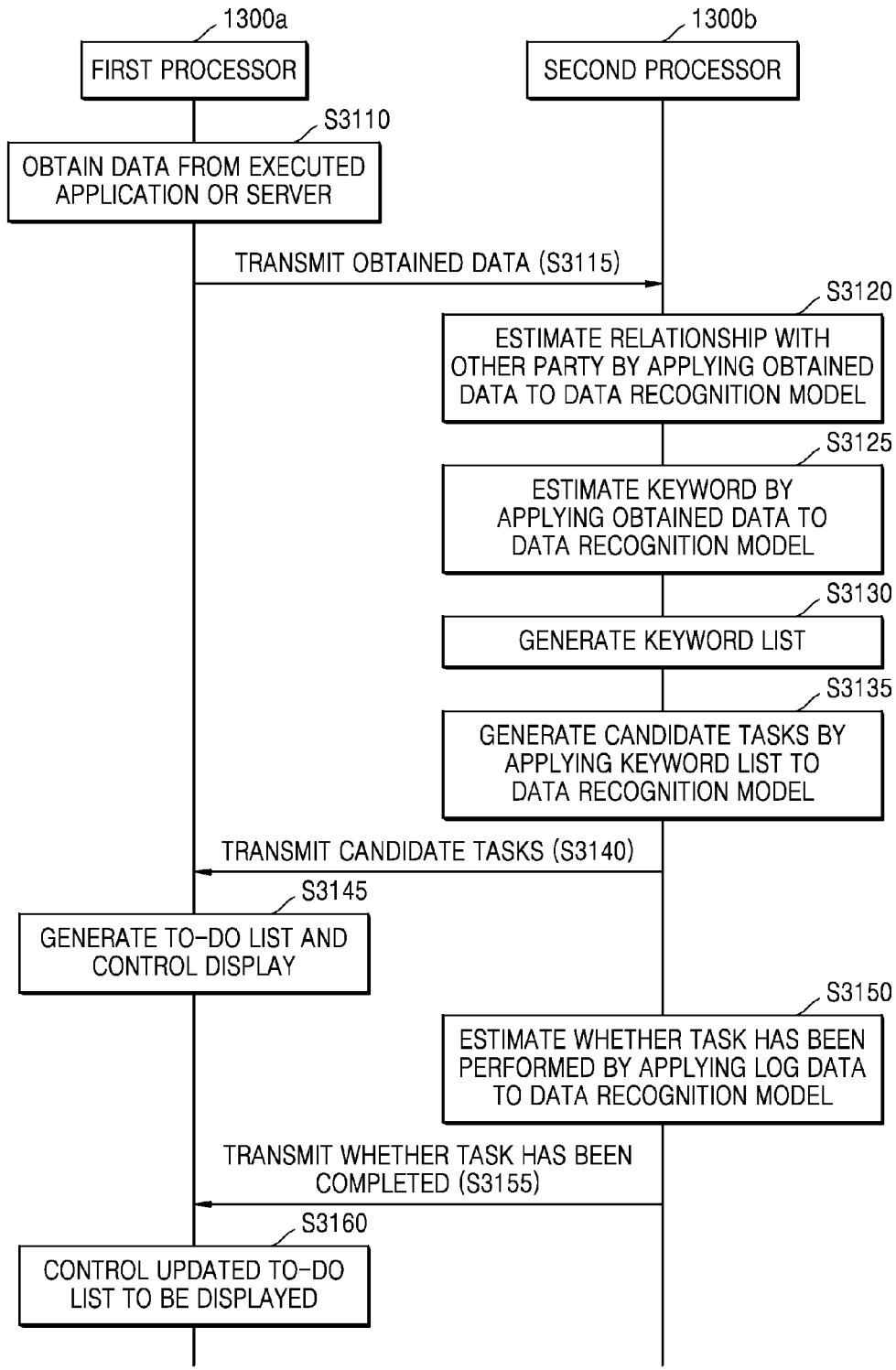
FIG. 31 is a flowchart of a method by which a first processor and a second processor manage a to do list of a user according to an embodiment.

FIG. 31 is a flowchart of a method by which a first processor 1300*a* and a second processor 1300*b* manage a to-do list of a user according to an example embodiment.

According to an example embodiment, the device 1000 may include the first processor 1300*a* and the second processor 1300*b*.

The first processor 1300*a* may control execution of at least one application installed in the device 1000, may perform graphics processing on an image obtained by the device 1000, or may obtain data (e.g., a text message or a voice dialog) stored in the at least one application. The first processor 1300*a* may be implemented as a system-on-chip that integrates functions of a CPU, a GPU, a communication chip, and a sensor.

The second processor 1300*b* may estimate a keyword from the data obtained from the application by using a data recognition model, and may estimate tasks (or candidate tasks) in a to-do list of a user by using the estimated keyword.

The second processor 1300*b* may be manufactured as a dedicated hardware chip for AI that performs a user task estimating function by using the data recognition model. Also, the device 1000 may further include a third processor and a fourth processor that perform the same function as that of the second processor 1300*b*.

According to various embodiments, a function performed by the first processor 1300*a* may be correspondingly performed by applications stored in a memory of the device 1000 and configured to perform various functions, and a function performed by the second processor 1300*b* may be correspondingly performed by an OS of the device 1000.

For example, a voice recognition application may recognize content of a dialog stored in the device 1000 and may convert the content of the dialog into text. The voice recognition application may transmit the text or information related to the text to the OS or an external server.

The OS or the external server may estimate a keyword from the text by using a data recognition mode included in the OS or the external server.

In operation S3110, the first processor 1300*a* may obtain data from an application executed in the device 1000 or a server located outside the device 1000.

For example, the first processor 1300*a* may obtain data used to generate a to-do list of a user from a plurality of applications installed in the device 1000. The obtained data may be data about, for example, content of a call through the device 1000, content of a message (e.g., an SMS message, an MMS message, a chatting message, or an E-mail), content of voice recorded on the device 1000, and a text file, a photo, a video, content of a schedule of the user, and a memo stored in the device 1000.

In operation S3115, the first processor 1300*a* may transmit the obtained data to the second processor 1300*b*.

In operation S3120, the second processor 1300*b* may estimate at least one relationship with the other party included in a contacts application by applying the obtained data to a data recognition model.

For example, the data recognition model may estimate that data obtained in the content of the call has a relationship with the other party in the contacts application. Also, the data recognition model may estimate that a person having a position included in the content of the chatting message has a relationship with the other party in the contacts application.

In operation S3125, the second processor 1300*b* may estimate a keyword used to estimate candidate tasks (or tasks) to be performed by the user by applying the obtained data to the data recognition model. For example, the second processor 1300*b* may apply the obtained data to the data recognition model set to estimate a keyword.

In operation S3130, the second processor 1300*b* may generate a keyword list by estimating at least one keyword.

In operation S3135, the second processor 1300*b* may estimate candidate tasks (or tasks) to be performed by the user by applying the keyword list to the data recognition model. For example, the second processor 1300*b* may apply the keyword list to the data recognition model set to estimate candidate tasks. According to an example embodiment, the second processor 1300*b* may estimate candidate tasks provided as sentences indicating tasks.

In operation S3140, the second processor 1300*b* may transmit the estimated candidate tasks to the first processor 1300*a*.

In operation S3145, the first processor 1300*a* may generate a to-do list of the user including at least one from among the received candidate tasks, and may control the to-do list to be displayed on a display or the like.

In operation S3150, the second processor 1300*b* may estimate whether a task included in the to-do list has been performed by using log data of the device 1000. For example, when the task is "Buy Water from Market", the second processor 1300*b* may determine whether a location of the user is the same as a location of the market by using a GPS application included in the device 1000, and may determine whether payment text is received by a text application included in the device 1000.

In operation S3155, the second processor 1300*b* may transmit information about whether the task has been completed to the first processor 1300*a*.

In operation S3160, the first processor 1300*a* may update and display the to-do list according to the information about whether the task has been completed. For example, when it is determined that the task has been performed, the first processor 1300*a* may remove the task. Also, when it is determined that the task has not been performed, the first processor 1300*a* may output notification information indicating that the task has not been performed to the user.

Figure 32:
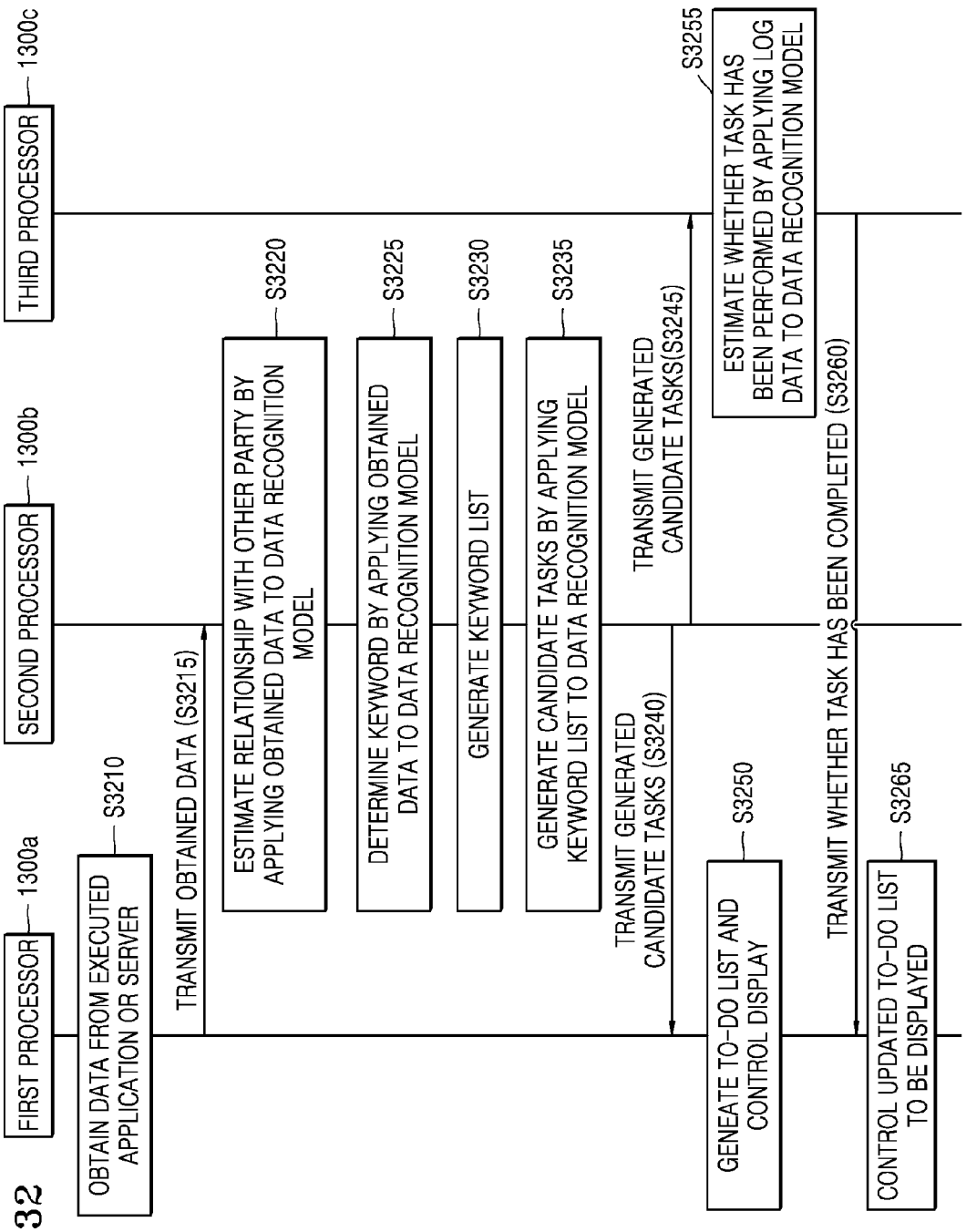
FIG. 32 is a flowchart of a method by which a first processor, a second processor, and a third processor manage a to-do list of a user according to an embodiment.

FIG. 32 is a flowchart of a method by which the first processor 1300*a*, the second processor 1300*b*, and a third processor 1300*c* manage a to-do list of a user according to an example embodiment.

According to an example embodiment, the device 1000 may include the first processor 1300*a*, the second processor 1300*b*, and the third processor 1300*c*.

In operation S3210, the first processor 1300*a* may obtain data from an application executed in the device 1000 or a server located outside the device 1000.

In operation S3215, the first processor 1300*a* may transmit the obtained data to the second processor 1300*b*.

In operation S3220, the second processor 1300*b* may estimate at least one relationship with the other party included in a contacts application by applying the obtained data to a data recognition model.

In operation S3225, the second processor 1300*b* may estimate a keyword used to estimate candidate tasks (or tasks) to be performed by a user by applying the obtained data to the data recognition model. The data recognition model may be, for example, a data recognition model set to estimate a keyword.

In operation S3230, the second processor 1300*b* may generate a keyword list by estimating at least one keyword.

In operation S3235, the second processor 1300*b* may estimate candidate tasks (or tasks) to be performed by the user by applying the keyword list to the data recognition model. The data recognition model may be, for example, a data recognition model set to estimate candidate tasks.

In operation S3240, the second processor 1300*b* may transmit the generated candidate tasks to the first processor 1300*a*.

In operation S3245, the second processor 1300*b* may transmit the generated candidate tasks to the third processor 1300*c*.

In operation S3250, the first processor 1300*a* may generate a to-do list of the user including at least one from among the received candidate tasks, and may control the to-do list to be displayed on a display or the like.

In operation S3255, the third processor 1300*c* may estimate whether a task included in the to-do list has been performed by using log data of the device 1000. For example, when the task is "Buy Water from Market", the third processor 1300*c* may determine whether a location of the user is the same as a location of the market by using a GPS application included in the device 1000, and may determine whether payment text is received by a text application included in the device 1000.

In operation S3260, the third processor 1300c may transmit information about whether the task has been completed to the first processor 1300a.

In operation S3265, the first processor 1300a may control the device 1000 to display the updated to-do list by using the information about whether the task has been performed. For example, when it is determined that the task has been performed, the first processor 1300a may remove the task. Also, when it is determined that the task has not been performed, the first processor 1300a may output notification information indicating that the task has not been performed to the user.

Figure 33:
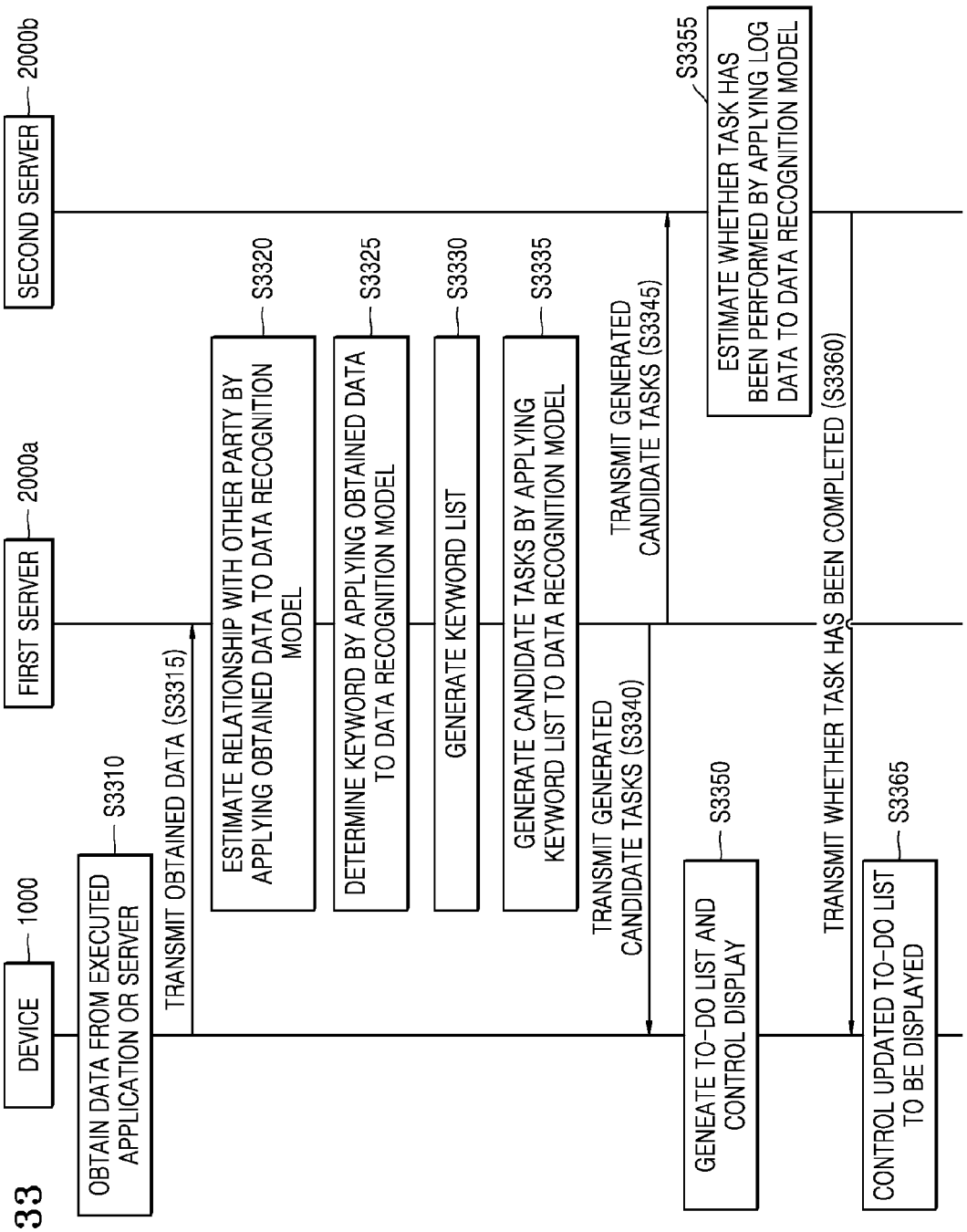
FIG. 33 is a flowchart for explaining a situation in which a device manages a to-do list by using a plurality of servers according to an embodiment.

FIG. 33 is a flowchart for explaining a situation where the device 1000 manages a to-do list by using a plurality of servers, e.g., first and second servers 2000a and 2000b, according to an example embodiment.

According to an example embodiment, the device 1000 may manage a to-do list by using the first server 2000a and the second server 2000b.

According to an example embodiment, the server 2000 may be a computing device that provides a service to the device 1000, and examples of the server 2000 may include a smartphone, a tablet PC, a PC, a smart TV, a mobile phone, a PDA, a laptop, a media player, a micro-server, a GPS device, an electronic book terminal, a home appliance, and a mobile computing device. However, embodiments are not limited thereto, and examples of the server 2000 may include any type of device having a communication function and a data processing function.

Also, the device 1000 may be connected to the server 2000 through a network. In this case, examples of the network may include a local area network (LAN), a wide area network (WAN), a value-added network (VAN), a mobile radio communication network, a satellite communication network, and a combination thereof. The network is a data communication network for smooth communication between the device 1000 and the server 2000 in a broad sense, and examples of the network may include a wired Internet, a wireless Internet, and a mobile wireless communication network.

In operation S3310, the device 1000 may obtain data from an application executed in the device 1000.

In operation S3315, the device 1000 may transmit the obtained data to the first server 2000a.

In operation S3320, the first server 2000a may estimate at least one relationship with the other party included in a contacts application by applying the obtained data to a data recognition model.

In operation S3325, the first server 2000a may estimate a keyword used to estimate candidate tasks (or tasks) to be performed by a user by applying the obtained data to the data recognition model. The data recognition model may be, for example, a data recognition model set to estimate a keyword.

In operation S3330, the first server 2000a may generate a keyword list by estimating at least one keyword.

In operation S3335, the first server 2000a may estimate candidate tasks (or tasks) to be performed by the user by applying the keyword list to the data recognition model. The data recognition model may be, for example, a data recognition model set to estimate candidate tasks.

In operation S3340, the first server 2000a may transmit the generated candidate tasks to the device 1000.

In operation S3345, the first server 2000a may transmit the generated candidate tasks to the second server 2000b.

In operation S3350, the device 1000 may generate a to-do list of the user including at least one from among the received candidate tasks, and may control the to-do list to be displayed on a display or the like.

In operation S3355, the second server 2000b may estimate whether a task included in the to-do list has been performed by using log data of the device 1000. For example, when the task is "Buy Water from Market", the second server 200b may determine whether a location of the user is the same as a location of the market by using a GPS application included in the device 1000, and may determine whether payment text is received by a text application included in the device 1000.

In operation S3360, the second server 2000b may transmit information about whether the task has been completed to the first processor 1300a.

In operation S3365, the device 1000 may control the device 1000 to display the updated to-do list by using the information about whether the task has been performed. For example, when it is determined that the task has been performed, the device 1000 may remove the task. Also, when it is determined that the task has not been performed, the device 1000 may output notification information indicating that the task has not been performed to the user.

FIG. 34 is a flowchart for explaining a situation where the device 1000 manages a to-do list by using the first processor 1300a, the second processor 1300b, and the server 2000 according to an example embodiment.

In operation S3410, the first processor 1300a may obtain data from an application executed in the device 1000.

In operation S3415, the first processor 1300a may transmit the obtained data to the second processor 1300b.

In operation S3420, the second processor 1300b may estimate at least one relationship with the other party included in a contacts application by applying the obtained data to a data recognition model.

In operation S3425, the second processor 1300b may estimate a keyword used to estimate candidate tasks (or tasks) to be performed by a user by applying the obtained data to the data recognition model. The data recognition model may be, for example, a data recognition model set to estimate a keyword.

In operation S3430, the second processor 1300b may generate a keyword list by estimating at least one keyword.

In operation S3435, the second processor 1300b may estimate candidate tasks (or tasks) to be performed by the user by applying the keyword list to the data recognition model. The data recognition model may be, for example, a data recognition model set to estimate candidate tasks.

In operation S3440, the second processor 1300b may transmit the generated candidate tasks to the first processor 1300a.

In operation S3445, the second processor 1300b may transmit the generated candidate tasks to the server 2000.

In operation S3450, the first processor 1300a may generate a to-do list of the user including at least one from among the received candidate tasks, and may control the to-do list to be displayed on a display or the like.

In operation S3455, the second processor 1300b may estimate whether a task included in the to-do list has been performed by using log data of the device 1000. For example, when the task is "Buy Water from Market", the third processor 1300c may determine whether a location of the user is the same as a location of the market by using a GPS application included in the device 1000, and may determine whether payment text is received by a text application included in the device 1000.

In operation S3460, the second processor 1300*b* may transmit information about whether the task has been completed to the first processor 1300*a*.

In operation S3465, the first processor 1300*a* may update the to-do list according to a result of the monitoring. For example, when it is determined that the task has been performed, the first processor 1300*a* may remove the task. Also, when it is determined that the task has not been performed, the first processor 1300*a* may output notification information indicating that the task has not been performed to the user.

In operation S3470, the server 2000 may select a substitute task based on environment information of the device 1000. For example, when a schedule "Buy Present at Department Store" is a task, the server 2000 may obtain information about whether the department store is closed at a date when the task is executed from a separate service server (e.g., a department store server).

In this case, the server 2000 may select a substitute task such as "Shop by Using Department Store Application" from among tasks included in a cluster to which the task "Buy Present at Department Store" belongs by using data that clusters various tasks collected by the server 2000.

In operation S3475, the serer 2000 may transmit the selected substitute task to the first processor 1300*a*.

In operation S3480, the first processor 1300*a* may change the to-do list by reflecting the substitute task and may control the changed to-do list to be displayed on the display.

Some embodiments may be implemented as a recording medium including a computer-readable command such as a computer-executable program module. The computer-readable medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable media, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

In addition, disclosed embodiments may be implemented as a software program including instructions stored in a computer-readable storage medium.

A computer which is an apparatus capable of calling stored instructions from a storage medium and operating according to an example embodiment according to the called instructions may include a device according to disclosed embodiments.

The computer-readable storage medium may be provided as a non-transitory storage medium. Here, 'non-transitory' means that the storage medium does not include a signal and is tangible, but does not distinguish whether data is stored semi-permanently or temporarily in the storage medium.

In addition, a control method according to disclosed embodiments may be provided in a computer program product. The computer program product may be traded between a seller and a purchaser as a product.

The computer program product may include a software program and a computer-readable storage medium storing a software program. For example, the computer program product may include a product (e.g., a downloadable application) that is electronically distributed as a software program through an electronic market (e.g., Google Play Store or AppStore) or a manufacturer of a device. For electronic distribution, at least a part of the software program may be stored in a storage medium or may be temporarily generated. In this case, the storage medium may be a server of the manufacturer, a server of the electronic market, or a storage medium of a relay server that temporarily stores the software program.

The computer program product may include a storage medium of a server or a storage medium of a device in a system including the server and the device. Alternatively, when a third apparatus (e.g., a smartphone) communicating with the server or the device exists, the computer program product may include a storage medium of the third apparatus. Alternatively, the computer program product may include a software program itself transmitted from the server to the device or the third apparatus or from the third apparatus to the device.

In this case, one from among the server, the device, and the third apparatus may execute the computer program product and may perform a method according to embodiments. Alternatively, two or more from among the server, the device, and the third apparatus may execute the computer program product and may execute the method according to embodiments.

For example, the server (e.g., a cloud server or an AI server) may execute the computer program product stored in the server and may control the device communicating with the server to perform the method according to embodiments.

Alternatively, the third apparatus may execute the computer program product and may control the device communicating with the third apparatus to perform the method according to embodiments. When the third apparatus executes the computer program product, the third apparatus may download the computer program product from the server and may execute the downloaded computer program product. Alternatively, the third apparatus may execute the computer program product that is preloaded and may perform the method according to embodiments.

Also, the term "unit" used herein may be a hardware component such as a processor a circuit and/or a software component executed in a hardware component such as a processor.

While the present disclosure has been particularly shown and described with reference to embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the present disclosure. For example, each component described in a single type may be executed in a distributed manner, and components described distributed may also be executed in an integrated form.

The scope of the present disclosure is indicated by the claims rather than by the detailed description of the present disclosure, and it should be understood that the claims and all modifications or modified forms drawn from the concept of the claims are included in the scope of the present disclosure.

What is claimed is:

1. An electronic device for providing a to-do list of a user, the electronic device comprising:
   a communicator, including communication circuitry, configured to communicate with an external device;
   a display;
   a memory storing one or more instructions; and
   a processor configured to execute the one or more instructions to:
      control to determine at least one first keyword to automatically suggest to the user for at least one task to be included in a to-do list, based on first data obtained by a first application executed on the display,
      control to generate a keyword list of the determined at least one first keyword,
      control the display to output a graphical user interface (GUI) for automatically suggesting the at least one first keyword to the user based on the obtained first data, and for allowing a user to select, for the to-do list, a keyword of the at least one first keyword in the keyword list,
      control to determine at least one second keyword based on second data obtained from a second application related to the at least one first keyword,
      control to add the at least one second keyword to the keyword list,
      control to select at least one of the at least one first keyword and the at least one second keyword through the GUI,
      control to automatically generate the at least one task in the to-do list, based at least on the selected at least one keyword through the GUI,
      control to determine at least one substitute task for deleting and replacing at least a portion of the at least one task in the to-do list, based on third data obtained by a third application different from the first application and the second application,
      control to update the to-do list by deleting and replacing the at least the portion of the at least one task, using the at least one substitute task, and
      control the display to output the updated to-do list.

2. The device of claim 1, wherein the processor is further configured to execute the one or more instructions to control the display to output the GUI for allowing the user to select the at least one of the at least one first keyword and the at least one second keyword in the keyword list, on an execution screen of the executed first application.

3. The device of claim 1, wherein the first application is a chatting application for communication with the external device, and the at least one first keyword is extracted from text transmitted/received between the electronic device and the external device.

4. The device of claim 1, wherein the processor is further configured to execute the one or more instructions to receive an input to select a keyword related to a first item in the keyword list through the GUI, determine at least one candidate task for the first item based on the selected keyword, and control the display to output a candidate task list of the determined at least one candidate task.

5. The device of claim 4, wherein the processor is further configured to execute the one or more instructions to determine the at least one candidate task for the first item by combining all or some of the selected keyword, the first data, the second data and the third data.

6. The device of claim 4, wherein the processor is further configured to execute the one or more instructions to edit the candidate task list at least by controlling the display.

7. The device of claim 4, wherein the processor is further configured to execute the one or more instructions to generate the to-do list comprising at least one main task and at least one sub-task subordinate to the at least one main task, based at least on the candidate task list.

8. The device of claim 1, wherein the processor is further configured to execute the one or more instructions to determine the at least one substitute task for deleting and replacing the at least the portion of the at least one task in the to-do list, based on the third data obtained by the third application and fourth data obtained from a service providing server to which the user has subscribed, and to control the display to output the at least one substitute task.

9. The device of claim 1, wherein the processor is further configured to execute the one or more instructions to obtain condition information used to determine whether the at least one task in the to-do list has been performed, and monitor whether the at least one task in the to-do list has been performed, based on the condition information.

10. The device of claim 9, wherein the processor is further configured to execute the one or more instructions to update tasks in the to-do list, based on monitoring whether the tasks in the to-do list have been performed.

11. A method by which an electronic device provides a to-do list of a user, the method comprising:
   determining at least one first keyword to automatically suggest to the user for at least one task to be included in a to-do list, based on first data obtained by a first application executed on a display of the electronic device;
   generating a keyword list of the determined at least one first keyword;
   displaying, by controlling the display, a graphical user interface (GUI) for automatically suggesting the at least one first keyword to the user based on the obtained first data, and for allowing a user to select, for the to-do list, a keyword of the at least one first keyword in the keyword list;
   determining at least one second keyword based on second data obtained from a second application related to the at least one first keyword;
   adding the at least one second keyword to the keyword list;
   selecting at least one of the at least one first keyword and the at least one second keyword through the GUI;
   automatically generating the at least one task in the to-do list, based at least on the selected at least one keyword through the GUI,
   determining at least one substitute task for deleting and replacing at least a portion of the at least one task in the to-do list, based on third data obtained by a third application,
   updating the to-do list by deleting and replacing the at least the portion of the at least one task, using the at least one substitute task, and
   displaying, by controlling the display, the updated to-do list.

12. The method of claim 11, wherein the displaying of the GUI comprises displaying the GUI for allowing the user to select the at least one of the at least one first keyword and the at least one second keyword in the keyword list, on an execution screen of the executed first application.

13. The method of claim 11, further comprising:
receiving an input that selects a keyword related to a first item in the keyword list through the GUI;
determining at least one candidate task for the first item based at least on the selected keyword; and
displaying a candidate task list of the determined at least one candidate task.

14. The method of claim 13, further comprising generating the to-do list comprising at least one main task and at least one sub-task subordinate to the at least one main task, based on at least the candidate task list.

15. The method of claim 11, wherein the determining the at least one substitute task comprises:
determining the at least one substitute task for deleting and replacing the at least the portion of the at least one task in the to-do list, based on the third data obtained by the third application and fourth data obtained from a service providing server to which the user has subscribed; and
displaying the at least one substitute task.

16. The method of claim 11, further comprising:
obtaining condition information used to determine whether the at least one task in the to-do list has been performed; and
monitoring whether the at least one task in the to-do list has been performed, based on the condition information.

17. A non-transitory computer-readable recording medium having embodied thereon a program for executing a method by which an electronic device provides a to-do list of a user, the method comprising:
determining at least one first keyword to automatically suggest to the user for at least one task to be included in a to-do list, based on first data obtained by a first application executed on a display of the electronic device;
generating a keyword list of the determined at least one first keyword;
displaying, by controlling the display, a graphical user interface (GUI) for automatically suggesting the at least one first keyword to the user based on the obtained first data, and for allowing a user to select, for the to-do list, a keyword of the at least one first keyword in the keyword list;
determining at least one second keyword based on second data obtained from a second application related to the at least one first keyword;
adding the at least one second keyword to the keyword list;
selecting at least one of the at least one first keyword and the at least one second keyword through the GUI;
automatically generating the at least one task in the to-do list, based at least on the selected at least one keyword through the GUI,
determining at least one substitute task for deleting and replacing at least a portion of the at least one task in the to-do list, based on third data obtained by a third application, and
updating the to-do list using the at least one substitute task, and
displaying, by controlling the display, the updated to-do list.

* * * * *